US010893141B2

(12) United States Patent
Segalis et al.

(10) Patent No.: US 10,893,141 B2
(45) Date of Patent: *Jan. 12, 2021

(54) AUTOMATED CALL REQUESTS WITH STATUS UPDATES

(71) Applicant: Google LLC, Mountain View, CA (US)

(72) Inventors: Eyal Segalis, Tel Aviv (IL); Daniel Walevski, Brooklyn, NY (US); Yaniv Leviathan, New York, NY (US); Yossi Matias, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,447

(22) Filed: Apr. 6, 2018

(65) Prior Publication Data
US 2018/0227418 A1 Aug. 9, 2018

Related U.S. Application Data

(63) Continuation of application No. 15/945,920, filed on Apr. 5, 2018, which is a continuation of application
(Continued)

(51) Int. Cl.
*H04M 3/493* (2006.01)
*G06F 40/205* (2020.01)
(Continued)

(52) U.S. Cl.
CPC .......... *H04M 3/4936* (2013.01); *G06F 40/20* (2020.01); *G06F 40/205* (2020.01); *G06F 40/56* (2020.01);
(Continued)

(58) Field of Classification Search
CPC .. H04M 3/4936; H04M 3/60; H04M 3/42093; H04M 3/42042; H04M 3/58;
(Continued)

(56) References Cited

U.S. PATENT DOCUMENTS 5,815,566 A 9/1998 Ramot et al.
6,304,653 B1 10/2001 O'Niel
(Continued)

FOREIGN PATENT DOCUMENTS

CN 103795877 5/2014
CN 105592237 5/2019
(Continued)

OTHER PUBLICATIONS

U.S. Appl. No. 15/945,920, filed Apr. 5, 2018.
(Continued)

*Primary Examiner* — Akelaw Teshale
(74) *Attorney, Agent, or Firm* — Middleton Reutlinger

(57) ABSTRACT

Methods, systems, and apparatus, including computer programs encoded on a computer storage medium, relating to synthetic call status updates. In some implementations, a method includes determining, by a task manager module, that a triggering event has occurred to provide a current status of a user call request. The method may then determine, by the task manager module, the current status of the user call request. A representation of the current status of the user call request is generated. Then, the generated representation of the current status of the user call request is provided to the user.

18 Claims, 15 Drawing Sheets

Related U.S. Application Data

No. 15/941,628, filed on Mar. 30, 2018, which is a continuation of application No. 15/940,113, filed on Mar. 29, 2018, which is a continuation of application No. 15/621,897, filed on Jun. 13, 2017.

(60) Provisional application No. 62/349,396, filed on Jun. 13, 2016.

(51) Int. Cl.

| | |
|---|---|
| G06F 40/56 | (2020.01) |
| G06N 20/00 | (2019.01) |
| G06Q 10/06 | (2012.01) |
| G06Q 10/10 | (2012.01) |
| G10L 15/00 | (2013.01) |
| G10L 15/18 | (2013.01) |
| G10L 15/22 | (2006.01) |
| H04M 3/42 | (2006.01) |
| H04M 3/58 | (2006.01) |
| H04M 3/60 | (2006.01) |
| G06F 40/20 | (2020.01) |
| G10L 13/08 | (2013.01) |
| G10L 25/63 | (2013.01) |

(52) U.S. Cl.
CPC ............ *G06N 20/00* (2019.01); *G06Q 10/06* (2013.01); *G06Q 10/10* (2013.01); *G10L 15/005* (2013.01); *G10L 15/1807* (2013.01); *G10L 15/222* (2013.01); *H04M 3/42042* (2013.01); *H04M 3/42093* (2013.01); *H04M 3/493* (2013.01); *H04M 3/58* (2013.01); *H04M 3/60* (2013.01); *G10L 13/08* (2013.01); *G10L 15/1815* (2013.01); *G10L 25/63* (2013.01); *G10L 2015/227* (2013.01); *H04M 2242/18* (2013.01)

(58) Field of Classification Search
CPC ...... H04M 3/493; H04M 3/527; G06N 20/00; G10L 15/222; G10L 15/1807; G10L 15/005; G10L 2015/227; G10L 15/1815; G10L 13/08; G06F 17/2881; G06F 17/2705; G06F 17/27; G06Q 50/30; G06Q 10/10; G06Q 10/06
See application file for complete search history.

(56) References Cited

U.S. PATENT DOCUMENTS

| | | | |
|---|---|---|---|
| 6,377,567 B1 | 4/2002 | Leonard | |
| 6,731,725 B1 | 5/2004 | Merwin | |
| 6,922,465 B1 | 7/2005 | Howe | |
| 7,084,758 B1 | 8/2006 | Cole | |
| 7,337,158 B2 | 2/2008 | Fratkina | |
| 7,539,656 B2 | 5/2009 | Fratkina | |
| 7,792,773 B2 | 9/2010 | McCord et al. | |
| 7,920,678 B2 | 4/2011 | Cooper et al. | |
| 8,345,835 B1 | 1/2013 | Or-Bach | |
| 8,594,308 B2 | 11/2013 | Soundar | |
| 8,938,058 B2 | 1/2015 | Soundar | |
| 8,964,963 B2 | 2/2015 | Soundar | |
| 9,232,369 B1* | 1/2016 | Fujisaki | H04M 1/6505 |
| 9,318,108 B2 | 4/2016 | Gruber | |
| 9,467,566 B2 | 10/2016 | Soundar | |
| 9,473,637 B1* | 10/2016 | Venkatapathy | G06F 16/90332 |
| 2002/0051522 A1 | 5/2002 | Merrow | |
| 2002/0055975 A1 | 5/2002 | Petrovykh | |
| 2003/0009530 A1 | 1/2003 | Philonenko | |
| 2003/0063732 A1 | 4/2003 | Mcknight | |
| 2004/0001575 A1 | 1/2004 | Tang | |
| 2004/0083195 A1 | 4/2004 | McCord | |
| 2004/0213384 A1 | 10/2004 | Alles | |
| 2004/0240642 A1* | 12/2004 | Crandell | H04M 7/128 |
| | | | 379/88.22 |
| 2005/0147227 A1 | 7/2005 | Chervirala et al. | |
| 2005/0175168 A1 | 8/2005 | Summe | |
| 2005/0271250 A1 | 12/2005 | Vallone | |
| 2006/0039365 A1 | 2/2006 | Ravikumar et al. | |
| 2006/0056600 A1* | 3/2006 | Merrow | H04M 1/82 |
| | | | 379/88.02 |
| 2007/0036320 A1* | 2/2007 | Mandalia | G06Q 10/109 |
| | | | 379/210.01 |
| 2007/0201664 A1 | 8/2007 | Salafia | |
| 2008/0181371 A1* | 7/2008 | Merrow | H04M 3/5158 |
| | | | 379/88.01 |
| 2008/0209449 A1 | 8/2008 | Maehira | |
| 2008/0309449 A1 | 12/2008 | Martin | |
| 2009/0022293 A1* | 1/2009 | Routt | G06Q 50/22 |
| | | | 379/201.02 |
| 2009/0029674 A1 | 1/2009 | Brezina | |
| 2009/0089096 A1 | 4/2009 | Schoenberg | |
| 2009/0089100 A1 | 4/2009 | Nenov | |
| 2009/0137278 A1 | 5/2009 | Haru | |
| 2009/0232295 A1* | 9/2009 | Ryskamp | H04M 3/523 |
| | | | 379/265.11 |
| 2010/0088613 A1 | 4/2010 | DeLuca | |
| 2010/0104087 A1 | 4/2010 | Byrd | |
| 2010/0124325 A1* | 5/2010 | Weng | G10L 15/22 |
| | | | 379/265.11 |
| 2010/0228590 A1 | 9/2010 | Muller | |
| 2011/0092187 A1* | 4/2011 | Miller | H04L 12/1818 |
| | | | 455/412.1 |
| 2011/0270687 A1 | 11/2011 | Bazaz | |
| 2012/0016678 A1 | 1/2012 | Gruber et al. | |
| 2012/0109759 A1* | 5/2012 | Oren | G06Q 30/02 |
| | | | 705/14.72 |
| 2012/0147762 A1 | 6/2012 | Hancock | |
| 2012/0157067 A1 | 6/2012 | Turner | |
| 2012/0173243 A1 | 7/2012 | Anand | |
| 2012/0271676 A1 | 10/2012 | Aravamudan et al. | |
| 2013/0060587 A1 | 3/2013 | Bayrak | |
| 2013/0077772 A1* | 3/2013 | Lichorowic | G06Q 40/08 |
| | | | 379/88.02 |
| 2013/0090098 A1* | 4/2013 | Gidwani | H04M 1/72566 |
| | | | 455/414.1 |
| 2013/0136248 A1 | 5/2013 | Kaiser-Nyman et al. | |
| 2013/0163741 A1 | 6/2013 | Balasaygun | |
| 2013/0275164 A1 | 10/2013 | Gruber et al. | |
| 2014/0024362 A1 | 1/2014 | Kang | |
| 2014/0029734 A1 | 1/2014 | Kim | |
| 2014/0037084 A1 | 2/2014 | Dutta | |
| 2014/0107476 A1 | 4/2014 | Tung | |
| 2014/0122077 A1 | 5/2014 | Nishikawa et al. | |
| 2014/0122618 A1 | 5/2014 | Duan | |
| 2014/0200928 A1 | 7/2014 | Watanabe | |
| 2014/0207882 A1 | 7/2014 | Joo et al. | |
| 2014/0247933 A1 | 9/2014 | Soundar | |
| 2014/0279050 A1 | 9/2014 | Makar et al. | |
| 2014/0280464 A1 | 9/2014 | De Ding et al. | |
| 2014/0310365 A1 | 10/2014 | Sample | |
| 2015/0139413 A1 | 5/2015 | Hewitt | |
| 2015/0142704 A1 | 5/2015 | London | |
| 2015/0150019 A1 | 5/2015 | Sheaffer | |
| 2015/0237203 A1 | 8/2015 | Siminoff | |
| 2015/0248817 A1 | 9/2015 | Steir | |
| 2015/0281446 A1 | 10/2015 | Milstein | |
| 2015/0339707 A1 | 11/2015 | Harrison | |
| 2015/0347399 A1 | 12/2015 | Aue et al. | |
| 2015/0350331 A1 | 12/2015 | Kumar | |
| 2015/0358790 A1* | 12/2015 | Nasserbakht | G06F 1/1626 |
| | | | 455/414.1 |
| 2016/0028891 A1 | 1/2016 | Pirat et al. | |
| 2016/0105546 A1 | 4/2016 | Keys | |
| 2016/0139998 A1 | 5/2016 | Dunn | |
| 2016/0198045 A1* | 7/2016 | Kulkarni | H04M 3/4938 |
| | | | 379/88.01 |
| 2016/0227033 A1 | 8/2016 | Song | |
| 2016/0227034 A1* | 8/2016 | Kulkarni | G10L 15/22 |
| 2016/0277569 A1 | 9/2016 | Shine | |
| 2016/0379230 A1 | 12/2016 | Chen | |

(56) References Cited

U.S. PATENT DOCUMENTS

| | | | |
|---|---|---|---|
| 2017/0037084 A1 | 2/2017 | Fasan | |
| 2017/0039194 A1 | 2/2017 | Tschetter | |
| 2017/0061091 A1 | 3/2017 | McElhinney | |
| 2017/0094052 A1* | 3/2017 | Zhang | H04M 3/2227 |
| 2017/0177298 A1* | 6/2017 | Hardee | G06F 3/167 |
| 2017/0180499 A1 | 6/2017 | Gelfenbeyn | |
| 2017/0289332 A1 | 10/2017 | Lavian | |
| 2017/0358296 A1 | 12/2017 | Segalis et al. | |
| 2017/0359463 A1 | 12/2017 | Segalis et al. | |
| 2017/0359464 A1 | 12/2017 | Segalis et al. | |
| 2017/0365277 A1 | 12/2017 | Park et al. | |
| 2018/0124255 A1* | 5/2018 | Kawamura | G06F 1/1694 |
| 2018/0133900 A1 | 5/2018 | Breazeal et al. | |
| 2018/0220000 A1 | 8/2018 | Segalis et al. | |
| 2018/0227416 A1 | 8/2018 | Segalis et al. | |
| 2018/0227417 A1 | 8/2018 | Segalis et al. | |
| 2019/0281159 A1 | 9/2019 | Segalis et al. | |
| 2019/0306314 A1 | 10/2019 | Segalis et al. | |
| 2020/0042597 A1 | 2/2020 | Wu | |

FOREIGN PATENT DOCUMENTS

| | | |
|---|---|---|
| EP | 1679693 | 7/2006 |
| JP | 2004-508748 | 3/2004 |
| JP | 2009-210703 | 9/2009 |
| JP | 2015-070371 | 4/2015 |
| KR | 20130099423 | 9/2013 |
| KR | 20140121105 | 10/2014 |
| WO | WO 2007065193 | 6/2007 |

OTHER PUBLICATIONS

U.S. Appl. No. 15/941,628, filed Mar. 30, 2018.
U.S. Appl. No. 15/940,113, filed Mar. 29, 2018.
U.S. Appl. No. 15/621,897, filed Jun. 13, 2017.
Notice of Allowance issued in U.S. Appl. No. 15/621,923, dated Jul. 11, 2019, 13 pages.
Notice of Allowance issued in U.S. Appl. No. 15/621,869, dated Aug. 7, 2019, 10 pages.
Notice of Allowance issued in U.S. Appl. No. 15/945,920, dated Aug. 19, 2019, 10 pages.
Notice of Allowance issued in U.S. Appl. No. 15/941,628, dated Aug. 20, 2019, 10 pages.
Notice of Allowance issued in U.S. Appl. No. 15/940,113, dated Aug. 21, 2019, 9 pages.
International Search Report and Written Opinion issued in International Application No. PCT/US2017/037290, dated Sep. 14, 2017, 12 pages.
Written Opinion issued in International Application No. PCT/US2017/037290, dated May 24, 2018, 5 pages.
Office Action issued in U.S. Appl. No. 15/621,869, dated Mar. 15, 2018, 12 pages.
Office Action issued in U.S. Appl. No. 16/621,897, dated Jan. 8, 2018, 9 pages.
Office Action issued in U.S. Appl. No. 15/621,897, dated Jul. 31, 2018, 15 pages.
Office Action issued in U.S. Appl. No. 15/940,113, dated May 15, 2018, 16 pages.
Office Action issued in U.S. Appl. No. 15/941,628, dated Jun. 13, 2018, 12 pages.
Notice of Allowance issued in U.S. Appl. No. 15/621,897, dated Mar. 26, 2019, 12 pages.
Notice of Allowance issued in U.S. Appl. No. 15/621,897, dated Dec. 28, 2018, 15 pages.
Office Action issued in U.S. Appl. No. 15/941,628, dated Dec. 31, 2018, 10 pages.
Office Action issued in U.S. Appl. No. 15/621,923, dated Jan. 28, 2019, 9 pages.
PCT International Preliminary Report on Patentability issued in International Application No. PCT/US2017/037290, dated Dec. 27, 2018, 7 pages.
Office Action issued in U.S. Appl. No. 15/621,869, dated Sep. 25, 2018, 8 pages.
Office Action issued in U.S. Appl. No. 15/940,113, dated Oct. 2, 2018, 16 pages.
Notice of Allowance issued in U.S. Appl. No. 15/940,113, dated Feb. 25, 2019, 7 pages.
Office Action issued in U.S. Appl. No. 15/945,920, dated Mar. 7, 2019, 7 pages.
Notice of Allowance issued in U.S. Appl. No. 15/621,869, dated Apr. 3, 2019, 20 pages.
EP Communication pursuant to Article 94(3) in European Appln. No. 17745543, dated Nov. 26, 2019, 6 pages.
JP Office Action in Japanese Appln. No. 2018-559748, dated Nov. 29, 2019, 8 pages (with machine translation).
CN Office Action in Chinese Appln. No. 201710444727.2, dated Aug. 28, 2019, 24 pages (with English translation).
U.S. Notice of Allowance issued in U.S. Appl. No. 15/621,923, dated Nov. 7, 2019, 11 pages.
U.S. Notice of Allowance issued in U.S. Appl. No. 16/621,897, dated Nov. 22, 2019, 9 pages.
U.S. Office Action issued in U.S. Appl. No. 15/947,447, dated Oct. 1, 2019, 26 pages.
China National Intellectual Property Administration, Office Action issued in Application No. 2017104447272; 27 pages; dated Feb. 3, 2020.
The Korean Intellectual Property Office; Office Action issued in Application No. 10-2018-7036260; 63 pages; dated Jan. 30, 2020.
The Japanese Patent Office; Notice of Allowance issued in Application No. 2018-559748 dated Jun. 15, 2020.
China National Intellectual Property Administration; Decision of Rejection issued in Application No. 201710444727.2; 21 pages; dated Jun. 28, 2020.

* cited by examiner

1100

Analyze, by a call initiating system, a real-time conversation between a first human and the bot during a phone call between the first human on a first end of the phone call and the bot on a second end of the phone call.
1102

Determine, by the call initiating system based on analysis of the real-time conversation, whether the phone call should be transitioned from the bot to a second human on the second end of the phone call
1104

In response to determining that the phone call should be transitioned to a second human on the second end of the phone call, transitioning, by the call initiating system, the phone call from the bot to the second human.
1106

FIG. 11

AUTOMATED CALL REQUESTS WITH STATUS UPDATES

CROSS-REFERENCE TO RELATED APPLICATION

This application is a continuation of U.S. patent application Ser. No. 15/945,920, filed on Apr. 5, 2018, which is a continuation of U.S. patent application Ser. No. 15/941,628, filed on Mar. 30, 2018, which is a continuation of U.S. patent application Ser. No. 15/940,113, filed on Mar. 29, 2018, which is a continuation of U.S. patent application Ser. No. 15/621,897, filed on Jun. 13, 2017, which claims the benefit of U.S. Provisional Patent Application No. 62/349,396, filed on Jun. 13, 2016, which is incorporated by reference in its entirety.

FIELD

This specification relates to natural language processing.

BACKGROUND

Users may need to collect types of information that is not easily obtained without human interaction. For example, in order to verify or collect data from multiple places of business or organizations, a user may need to call each of the businesses or organizations in order to gather the information. While web search engines can assist users with such tasks by providing contact information for a service or business, the user must still call the service or business themselves to complete the task themselves.

In order to maintain a database of information gathered from multiple places of business or organizations, a human operator can initiate automated calls to large numbers of businesses to collect data, but selecting the callees (e.g., all restaurants in a particular town that serve the same cuisine) and placing the calls can be time-consuming when performed manually. Moreover, determining when and whether to place the calls generally requires human analysis of existing data in order to identify a need for verification, updating, or supplemental information.

Users may also wish to perform tasks such as make appointments or hire a service. However, there is generally a person with whom a user must interact to complete the desired task. For example, a user may be required to call and speak with a hostess in order to make a reservation at a small restaurant that does not have a website. In some cases, even when users place the calls themselves, they may encounter automated phone trees that often accept only a limited set of user responses.

SUMMARY

A system can assist a user with various tasks that involve communicating with a human through a phone call, or with an automated system operated through a phone (e.g., IVR), by determining, from data received by the system, whether to initiate a call to a particular number. Once a call is placed, the system may obtain information, provide information to a third party, execute an action, e.g., on behalf of the user, and so forth. In certain examples, the system participates in a dialog with a human on the user's behalf. The dialog can occur via a telephone connection between the system and the human. In certain examples, the system may include, operate with, or form a part of a search engine following a workflow associated with intents of search engine users who submit queries involving tasks to be completed. The system may execute the tasks for the users through at least one autonomous or semi-autonomous software agent ("bot") operations.

In one general aspect, a method includes receiving, by a call triggering module of a call initiating system for placing calls and conducting conversations between a bot of the call initiating system and a human callee during the calls, data indicating a first event; determining, by the call triggering module and using the data indicating the first event, that the first event is a specific trigger event of a plurality of possible trigger events that triggers a workflow for the call initiating system that begins with initiating a phone call; selecting, based on the determined trigger event, a particular workflow from multiple possible workflows, the particular workflow corresponding to the determined trigger event; and in response to the selecting, i) initiating a phone call to a callee specified by the particular workflow, and ii) executing the workflow as a two-way conversation between the bot and the callee.

Implementations may include one or more of the following features. For example, the determined trigger event is an inconsistency of a value associated with a first data source and a corresponding value associated with a second data source. The data indicating the first event may be provided by a user. The determined trigger event may be a user request. The determined trigger event may be a particular type of event that is one of: a weather event, an entertainment event, or a seasonal event. The determined trigger event may be a trend detected in search requests submitted to a search engine. The determined trigger event may be a passing of a predetermined period of time.

In another general aspect, a method includes determining, by a task manager module, that a triggering event has occurred to provide a current status of a user call request; determining, by the task manager module, the current status of the user call request; generating a representation of the current status of the user call request; and providing, to the user, the generated representation of the current status of the user call request.

Implementations may include one or more of the following features. For example, the determined trigger event may be a user request for status. The determined trigger event may be an operator interaction to provide status to a user after the operator has reviewed session information associated with the user call request. The determined trigger event may be a status update event. The representation of the current status may be a visual representation. The representation of the current status may be an oral representation. Providing the user the generated representation of the current status of the user call request may include determining a convenient time and method for delivering the current status to the user.

In another general aspect, a method for transitioning a phone call away from a bot includes: analyzing, by a call initiating system, a real-time conversation between a first human and the bot during a phone call between the first human on a first end of the phone call and the bot on a second end of the phone call; determining, by the call initiating system based on analysis of the real-time conversation, whether the phone call should be transitioned from the bot to a second human on the second end of the phone call; and in response to determining that the phone call should be transitioned to a second human on the second end of the phone call, transitioning, by the call initiating system, the phone call from the bot to the second human.

Implementations may include one or more of the following features. For example, analyzing the real-time conversation between the first human and the bot during the phone call may comprise: determining strain during the phone call based on conduct, demeanor, tone, annoyance level, language, or word choice of the first human. The method may include determining an increase in strain during the phone call when the bot repeats itself, apologizes, or asks for clarification. The method may include determining an increase in strain during the phone call when the human corrects the bot or complains about the quality of the call. The method may include determining a decrease in strain during the phone call when the bot appropriately responds to dialog of the first human. Analyzing the real-time conversation between the first human and the bot during the phone call may include determining a confidence level of the call initiating system that a task of the phone call will be completed by the bot. Analyzing the real-time conversation between the first human and the bot during the phone call may include determining that the first human asked for the phone call to be transitioned to another human. Analyzing the real-time conversation between the first human and the bot during the phone call may include determining that the first human has mocked the bot or asked if the bot is a robot. Determining whether the phone call should be transitioned from the bot to a second human may include determining that the strain is above a predefined threshold; and in response to the strain being above a predefined threshold, determining that the phone call should be transitioned from the bot to the second human. Analyzing the real-time conversation between the first human and the bot during the phone call may include keeping track of one or more events in the conversation. Determining whether the phone call should be transitioned from the bot to a second human may include using a feature-based rule set that determines whether the one or more events in the conversation meet criteria of a rule; and in response to determining that the one or more events in the conversation meet the criteria of a rule, determining that the phone call should be transitioned from the bot to the second human.

Analyzing the real-time conversation between the first human and the bot during the phone call may include identifying intents from the conversation and identifying historical intents and historical outcomes from previous conversations. Determining whether the phone call should be transitioned from the bot to a second human may include sending intents from the conversation, historical intents, or historical outcomes to one or more machine learning models; and determining whether the phone call should be transitioned based on the intents, historical intents, or historical outcomes. The second human may be a human operator. The bot may use the same voice as the human operator so that the transition from the bot to the second human is transparent to the first human. The second human may be the user for which the bot is conducting the phone call. The method may include terminating the phone call when transitioning the phone call from the bot to the second human takes longer than a predetermined amount of time. The method may include terminating the phone call instead of transitioning the phone call to a human.

Other implementations of this and other aspects include corresponding methods, apparatus, and computer programs, configured to perform the actions of the methods, encoded on computer storage devices. One or more computer programs can be so configured by virtue of having instructions that, when executed by data processing apparatus, cause the apparatus to perform the actions.

Particular embodiments of the subject matter described in this document can be implemented so as to realize one or more of the following advantages. The amount of data storage required for various data sources is reduced because only one set of confirmed data is stored instead of multiple sets of unconfirmed data. For example, instead of storing three different unconfirmed sets of business hours for a particular grocery store (e.g., one set collected from the storefront, one set collected from the store's website, and one set collected from the store's answering machine), a data source can store one set of confirmed store hours obtained from a call to a human representative of the grocery store.

By automatically detecting trigger events that indicate to the call initiating system that a call is to be initiated, the amount of human input required to perform operations such as collecting data from callees, scheduling appointments, or providing information to third parties is reduced. Additionally, because calls are only initiated when a trigger event occurs, the amount of computer resources needed to maintain a database of information is reduced due to the reduction in calls placed. The system automatically places calls to particular callees or sets of callees, reducing the amount of analysis that a human must perform and the amount of data that a human must monitor.

Additionally, the system conducts conversations on behalf of human users, further reducing the amount of human input required to perform particular tasks. The call initiating system can coordinate multiple calls at the same time. For example, a user may wish to make a reservation for thirty minutes in the future. The system can call each restaurant specified by the user and carry out a conversation with a representative on the other line. An employee of a first restaurant called may suggest that a reservation can be made, but the diner must sit at the bar. An employee of a second restaurant called may suggest there is a wait time of twenty minutes, and an employee of a third restaurant called may inform the system that the third restaurant requires that diners finish their meals within one hour, and therefore a table will be ready within the hour. The system can make the call to each of the three restaurants in parallel, consult the user by presenting his options and receiving a response, and make a reservation at the restaurant most suitable for the user based on his response while declining all other reservations. The automated call initiating system is efficient than a human counterpart since the automated system can make these calls all at once. The human assistant is not able to easily make all of these restaurant calls in parallel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 11 shows an example process 1100 for transitioning a phone call from a bot to a human.

Like reference numbers and designations in the various drawings indicate like elements.

DETAILED DESCRIPTION

Figure 1A:
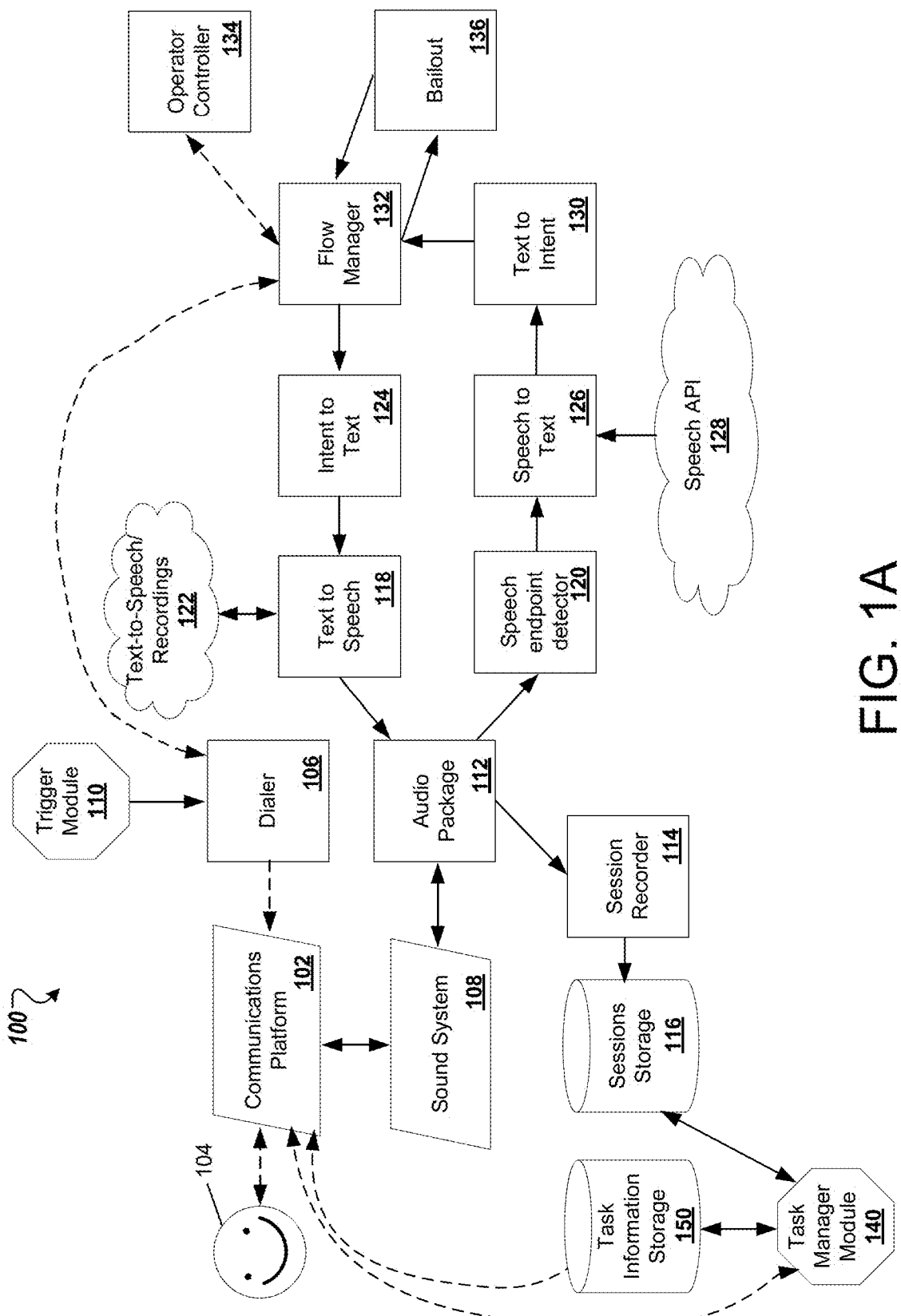
FIG. 1A shows an example block diagram of a system for a call initiating system that places calls and conducts conversations between a bot of the call initiating system and a human during the calls.

The present disclosure describes a technology that allows an automated or semi-automated system, referred to herein as a "bot," to communicate with people, by placing calls and independently conducting conversations with a human during the calls. The bot receives and monitors data to detect trigger events that indicate that a call should be initiated. The bot works through predefined workflows, or sequences of repeatable patterns of operations, each linked by abstract descriptions of operations to be performed, or intents. Essentially, the bot is able to use these workflows to determine how to react and what to say to a human in order to perform helpful tasks for a user.

The system handles various tasks, received as queries, such as: "book a table for two at Yves Saint Thomas Restaurant for Thursday," "my sink is leaking and I need a plumber! It's after 10 p.m.!", etc.

A user who wishes to schedule an appointment, purchase an item, request services, etc., may be required to perform multiple searches and place many calls before completing the task they set out to accomplish. In a first use case, booking a table at a restaurant, the user might search for the restaurant on a search engine. In some examples, if the restaurant happens to be on a website or application, the query may be executed on the website or application (or through integration with the website or application), and if not, the user might call the restaurant and negotiate the reservation.

As an example, the system may be used to place calls for a user. The system communicates with businesses and other services to complete tasks requested by users. In some examples, the bots perform much of the communication. In some examples, a human operator may review and verify the success of operations performed by the bots. In some examples, the human operator performs the actions, and the bots learn from the human operators' communications to improve their automated communication skills.

In a second use case, a user wishes to find a plumber outside of normal business hours. Such queries may be more difficult to process. For example, if the user were to search for a plumber manually, he might search for plumbers on a search engine and give a few of them a call. The user may have to explain to each plumber the time constraints, where they are located and the nature of the issue, and obtain a price estimate. This can be very time consuming.

Similarly, for a third use case, checking if a local store has a product in stock, the user might have to search for local stores and call each one to determine whether the store has the particular item or product they are looking for.

In addition to assisting users with specific tasks, the system can update an index of information, such as business open hours, services offered, etc. The system can be automatically triggered to update data responsive to detecting missing, aging, inconsistent data, etc. Generally, in order to obtain such information, a user may need to individually check each business or data source.

The system provides many advantages, including reducing the amount of human input required to complete certain tasks that involve initiating a phone call. For example, the system can automatically initiate phone calls based on determining that certain triggering criteria have been met, such as an inconsistency between services offered by a salon and services listed on a third party reservation website. The system can reduce friction for transaction queries, for example, by detecting frustration or discomfort of a human on one end of the phone call and ending the call or making a change to the way the conversation is conducted. The system can connect users in developing countries with services, such as transportation or educational services. The system can also connect users with low tech industries that don't have websites or digital presences. Furthermore, the system is scalable for different applications, even compared to the largest aggregators.

FIG. 1A shows an example block diagram of a system for a call initiating system that places calls and conducts conversations between a bot of the call initiating system and a human 104 during the calls. Each component shown in diagram 100 will be described in detail below.

The system 100 includes various components and subsystems that work together to allow a bot to communicate effectively with the human 104. The system 100 may include a communication framework or platform 102, a dialer 106, a sound system 108, a call triggering module or trigger module 110, an audio package 112, a session recorder 114, a sessions storage 116, a text-to-speech module 118, a speech endpoint detector 120, stored text-to-speech results or recordings 122, an intent-to-text module 124, a speech-to-text module 126, a speech application program interface (API) 128, a text-to-intent module 130, a flow manager 132, an operator controller 134, and a bailout module 136. In some implementations, the system includes all modules. In other implementations, the system includes a combination of these modules. For example, in one implementation, the text-to-intent layer is unnecessary and the intent is directly given to the speech synthesis module.

Figure 1B:
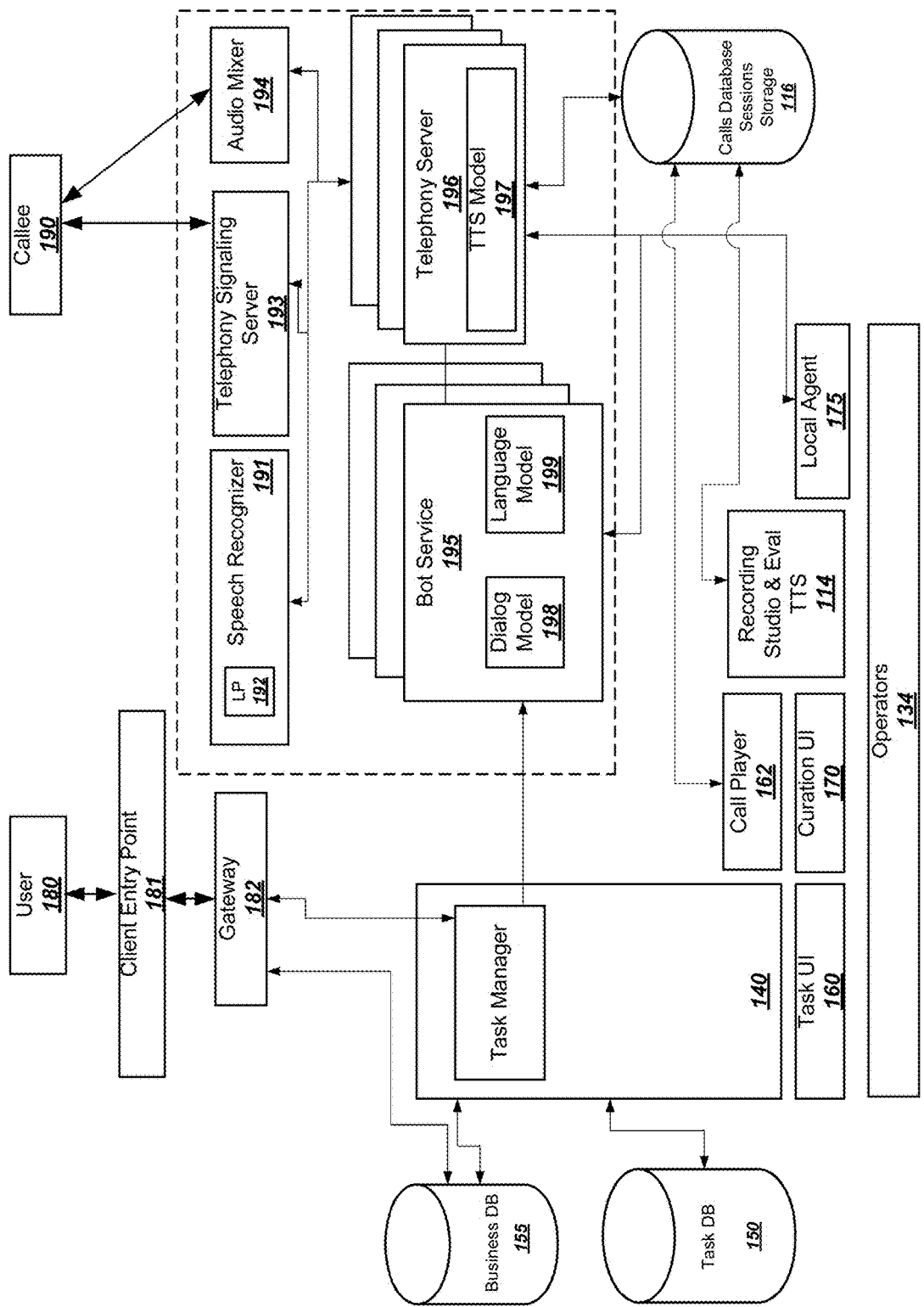
FIG. 1B shows an example block diagram of a system for a call initiating system that places calls and conducts conversations between a bot of the call initiating system and a human during the calls.

FIG. 1B shows an alternative example block diagram of a system for a call initiating system that places calls and conducts conversations between a bot of the call initiating system and a human during the calls. In this example, the communication platform 102 is replaced with a client entry point for user requests and a telephony signaling server for other requests, i.e., inbound calls from business. The system sends both types of requests to a telephony server (196) that makes the call with a bot service (195) conducting the call from the other end. In some implementations, the bot service (195) includes a dialog model (198) and a language model (199) to enable the bot service to conduct human-like phone conversations. The telephony server (196) may include a TTS model (197). A speech recognizer (191) and/or audio mixer (194) may provide information for the telephony server (196) to understand and respond back to the human on the other end of the phone call (190). Operators (134) monitor calls using a task user interface (160) and a curation user interface (170), The operators (134) can review recorded calls from the recording studio and evaluation TTS (114). A call player (162) will replay calls back to the operators (134). Operators can schedule calls using a local agent (175) to initiate phone calls through the telephony server (196).

In the implementation of FIG. 1A, the communication platform 102 allows the bot to contact external actors by performing tasks such as placing calls, receiving inbound calls from businesses or users (104, 144), or contacting target business. The communication platform 102 also allows the bot to receive requests from a user to make calls on the user's behalf.

In some implementations, a user requests a call to another user or business through interaction with a user interface or through a speech request. These user requests may be for assistant-type tasks such as: booking an appointment, making a restaurant reservation, finding a dog walker, or figuring out which store has an item that the user would like to purchase.

Figure 1C:
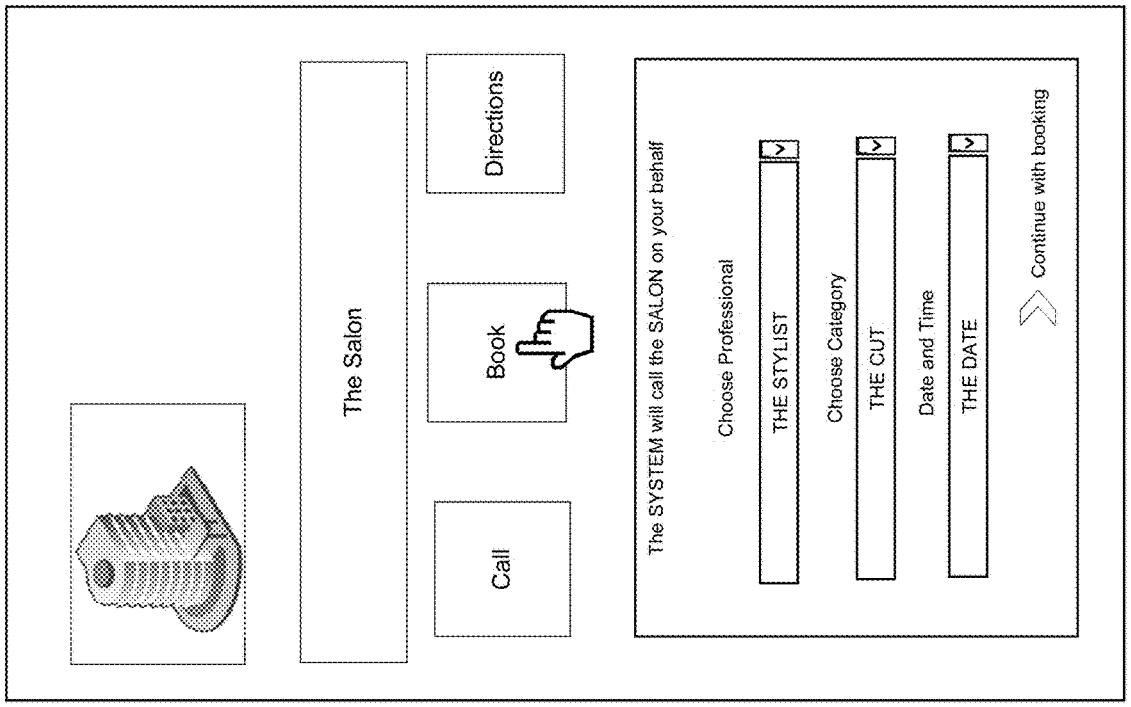
FIG. 1C shows an example user interface through which a user may enter more details about the request.

FIG. 1C shows an example user interface through which a user may enter more details about the request. A user may initiate a request by clicking a "book" button or interacting with the user interface in some other way. For example, if the user would like to make a haircut appointment, the user may interact with a website associated with a salon where the user would like to get a haircut. The user may alternatively interact with a search results list that includes the salon as a result in the search results or with a user interface showing the salon on the map. Any of these interfaces may allow the user to request a call. The user may enter the details of the user's request such as: the professional stylist the user would like to see, the category for the service the user would like to have done, and the date and time for the service. As shown in FIG. 1B, the user may click a "Continue with booking" button or take some other action to indicate that a request for a hair appointment is being made.

Figure 1D:
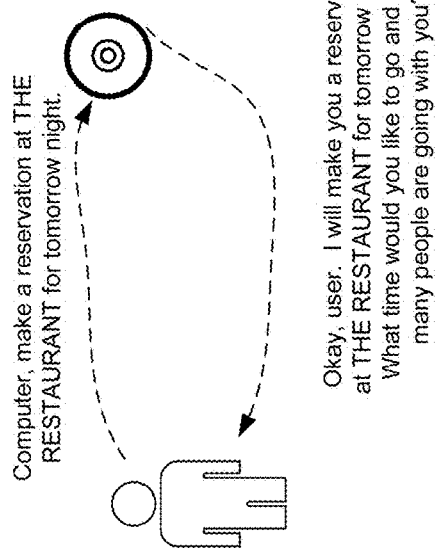
FIG. 1D shows an example of a user speaking to a bot in order to make a request.

FIG. 1D shows an example of a user speaking to a bot in order to make a request. After the user speaks a request to the bot, the bot may acknowledge the request. The bot may also request additional information about the request from the user. For example, if the user speaks a request to the bot about making a haircut, the bot may ask for information regarding where the user would like the haircut appointment, the day the haircut appointment should be scheduled, and what kind of haircut service the user would like to schedule.

A user may make a task request to the system at a time when the task cannot be performed. For example, the user may request a call to schedule a haircut appointment at 11 pm at night when all haircut salons are closed. Therefore, the system may store the request in the task information storage to be initiated and completed at a later date or time, such as during the open hours for the salon as otherwise determined by or obtained by system 100.

In some implementations, the system provides the user with initial feedback that there will be a delay in processing the request. For example, when the user makes the request to call to schedule a haircut appointment at 11 pm when the salons are closed, the system provides the user with a visual, audio, or some other indication that since the salon is closed, there will be a delay in completing the task until the system can reach the salon once it opens.

In some implementations, the task information storage 150 stores information about each task such as: the name of the user requesting the task, the one or more people or places to call, the type of task requested, the method in which the task request was made, details about the task that are type specific, details about the activities that have been done to complete the task, the start date of the task, the completion date of the task, the time of the last status update to the requesting user, the operator who double-checked the call task, the user requested end date for the task, and the current status of the task.

In some implementations, a task manager module 160 determines when to schedule calls to people or businesses. The task manager module 160 monitors tasks from the task information storage 150 and determines the appropriate time to schedule the received tasks. Some tasks are immediately scheduled while other tasks are scheduled after certain triggering events occur.

In many situations, there will be a human, such as the human 104, on the other end of a call placed by the system 100. The human 104 can be a representative of an organization that the bot is attempting to contact. In some examples, communication platforms are used in order to call businesses. The present system 100 can be integrated with the communication platforms. For example, the present system 100 can use a framework for testing web applications to programmatically operate a web browser and use a web-based teleconferencing service. The system 100 can create and use several communication platform accounts. In some examples, the system 100 can automatically alternate between different communication platform accounts to avoid throttling of call speed.

The dialer 106 facilitates initiating, or placing, the calls that the bot conducts. The dialer 106 is communicably connected to the communications platform 102. The dialer 106 provides instructions to the communications platform 102 to initiate a phone call to a particular callee selected by the dialer 106. For example, the dialer 106 can play audio tones corresponding to digits of a phone number. Once a call is placed, the system 100 can conduct a conversation with the human callee on the other end of the line.

The dialer 106 can receive instructions to initiate a call to a particular callee. For example, the dialer 106 can receive data containing instructions from other modules in the system 100 such as the trigger module 110 or the flow manager 132.

The trigger module 110 detects trigger events, or particular events that indicate that the system 100 should initiate a call to a particular callee. The trigger events can be events of a predetermined type. For example, a user of the system 100 can specify particular types of trigger events. The trigger events can include explicit actions performed by a user of the system 100, a detected pattern in data provided to the trigger module 110, a predetermined period of time passing since a particular event occurred, and various other types of events. In response to detecting a trigger event, the trigger module 110 provides instructions to the dialer 106 to initiate a call to a particular callee, or to the flow manager 132 to select a node of a particular workflow or provide instructions to the dialer 106.

The sound system 108 is used to record and play audio. In some examples, three virtual streams are set up: (a) incoming audio from a phone or teleconferencing service to the system 100; (b) outgoing audio from the system 100 back to the communication platform; (c) a mixed stream combining a and b, and are used to record the entire call. The sound system 108 uses the audio packages 112 to perform the communications through the communications platform 102.

The audio packages 112 are used to communicate with the sound system 108. In some examples, the present system 100 includes an audio module that wraps the audio package 112 and handles a continuous stream of incoming audio packets. The module also records every incoming packet, and allows to playback pre-recorded audio files. The present system 100 uses various bit depths, sampling frequencies, packet sizes, etc.

The system 100 can record incoming and outgoing conversations conducted by the bot. The audio package 112 can enable the system 100 to record a particular session, or call, using the session recorder 114. In some examples, the session recorder 114 can record the portion of the conversation conducted by the bot by recording the bot's speech as it is generated. In other examples, the session recorder 114 can record the portion of the conversation conducted by the bot by recording the bot's speech externally as it is output by the communications system 102 to the human 104. The session recorder 114 can record responses of the human 104 as well.

The session recorder 114 stores the recorded session data in the sessions storage 116. The recorded session data can be stored as audio data or as feature data that represents the audio data. For example, the recorded session data can be stored as vectors that store values for particular features of the audio data of the session. The sessions storage 116 can be a local database, a remote server, physical memory within the system 100, or any of various other types of memory.

A speech endpoint detector 120 simplifies conversations between the bot and a human on the other side of the line. In order to simplify the conversation, it is sectioned into individual sentences, discretely switching between the human and the bot. The speech endpoint detector 120 is responsible for receiving the continuous input audio stream from the audio package 112 and converting it into discrete sentences.

The speech endpoint detector 120 detects endpoints of speech. In one implementation, the speech endpoint detector 120 operates in two states: waiting for speech; and waiting for silence. The speech endpoint detector 120 alternates between these states as follows: each audio packet is examined by comparing its root-mean-square-deviation (RMSD) to a predefined threshold. A single packet is considered as "silence" if its RMSD is below this threshold. Whenever a non-silence packet is received, the module will switch from the "waiting for speech" state to the "waiting for silence" state. The module will switch back only after a period of consecutive silence packets lasting a predefined period of time, depending on the state of the entire system, is received.

In some implementations, during the "waiting for sound" period, the speech endpoint detector 120 fabricates pure-silence packets (one fabricated packet per ten real packets) and transmits them to the speech-to-text module 126. The fabricated packets can avoid disconnections from the speech API 128. During the "waiting for silence" period, the speech endpoint detector 120 transmits packets of silence from the stream for up to a predefined period of time (useful for baseline noise estimation) and then transmits all of the audio packets.

In other implementations, the speech endpoint detector 120 uses machine learning, neural networks, or some form of deep learning trained to observe the intonation and language context to find endpoints.

In some examples, the speech endpoint detector 120 considers what was said, the intonation of the speaker, etc., when determining how to parse a particular stream of audio input. For example, the speech endpoint detector 120 can determine that a particular human callee 104 has a tendency to end sentences with a low inflection, and speech endpoint detector 120 can predict the end of a sentence spoken by the callee 104 when a drop in inflection is detected. A speech endpoint detector 120 can adjust thresholds dynamically during the call based on the signal-to-noise ratio in a time frame.

The speech-to-text module 126 converts the audio data parsed by the speech endpoint detector 120 into text that can be analyzed for intent that is used to select the bot's next response. The output of the speech-to-text module 126 is an ordered list of speech options, and in some cases, a confidence for the best option is provided. The speech recognition process includes two major components: the acoustic module and the language module. For the acoustic module, the system can use a model trained from recordings of people talking directly to their phone. A neural network may be used by the model, and in some examples, the first layer of the neural network may be re-trained to account for the vocoders present in a phone call. A vocoder is a voice codec that produces sounds from an analysis of speech input. The neural network may also be re-trained to account for background noise which differs between calls to businesses and personal phone calls. The language module may be built using a system that biases the language module based on past experience of the system. In some examples, the bias may be configured automatically. In some examples, this bias is configured manually. In some examples, the language-bias configuration changes between verticals.

The speech-to-text module 126 uses the context of a call in order to bias the language module based on what the person from other side of the conversation is predicted to say. For example, the system's bot asks, "Are you open on Tuesday?" Based on this question, there is a high likelihood that the person on the other side of the conversation will respond with an answer such as, "no, we are closed" or "yeah, sure." The bot learns the likely responses based on past calls and uses predictions to understand the incoming audio. The bot can predict full sentence responses, but the bot may also predict phrases. For example, after the bot says: "we have seven people in our party," the bot may expect the phrase: "you said seven people?" The bot may also expect the phrase, "you said eleven?" since seven and eleven sound similar. The bot may also expect with some lower chance for a response such as, "you said two?" The bot can assign probability weight for each phrase based on its predictions.

In some implementations, the speech-to-text module 126 uses the speech API 128 to convert the audio data into text. In some examples, the speech API 128 uses machine learning to convert the audio data into text. For example, the speech API 128 can use models that accept audio data as inputs. The speech API 128 may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the speech API 128 may use supervised learning. In some examples, the speech API 128 uses unsupervised learning. In some examples, the speech API 128 can be accessed by the speech-to-text module 126 over a network. For example, the speech API 128 can be provided by a remote third party on a cloud server.

To address the synchronizing of dialog, such as determining the context in which a person was speaking in order to determine natural opportunities for response by the bot, the system 100 can identify an intent. An intent is a formal-language representation of a single semantic meaning in a sentence, either said by a human or by the bot. In some implementations, the system 100 ignores any intent received from a human between the last intent received and the bot's reply in order for the bot to produce a response relevant to the most recent sentence spoken by the human. The system 100 can, however, use previous intents to inform future responses. For example, the system can mark intents received before the most recent intent received as ANCIENT, parse the ANCIENT intent, and store it for offline evaluation. In some examples, various other forms of handling logic may be used.

While most of the system 100 is use case agnostic, some parts of the system 100 are either manually configured or fully programmed for a specific use case, namely a system vertical. A vertical is essentially composed of a schema of intents and business logic code. Intents in the schema are an internal formal-language representation of a single semantic meaning in a sentence, either said by the human or by the bot. For example, in the opening-hours extraction vertical, we have an "AreYouOpen {date:tomorrow}" bot intent, and a corresponding "WeAreClosed {date_range: Sep}" human intent. The process in which incoming audio from the human is transformed into an intent is referred to herein as Intent Resolution. The opposite process (transforming a bot intent into speech) is referred to as Intent to Speech. While the schema is configured per vertical, most of the code that learns and classifies the intents is generic and used across verticals. In some examples, only the language-specific parts of the system reside in the intent resolution and intent to speech configurations.

The logic code can be programmed per vertical (sharing some common code) and determines the bot behavior for every possible situation, defined by the context of the call (the input parameters and what happened so far), as well as the incoming human intent. In one implementation, speech is changed to text, which is then interpreted as human intent. The human intent is used to determine robot intent. In some verticals, the bot leads the conversation, while in other cases it mostly reacts to the human. For example: in data acquisition type of verticals, the bot aims to extract some information from the business. Usually, it will try to ask a sequence of questions until it gets all desired information. For transaction type verticals, where the bot aims to, for example, make a reservation, it will predominantly answer questions originated by the human ("what is your name?". . . "and phone number?" . . . ). In such cases, the system will take the lead only if the human suddenly becomes silent, etc. Programmers can design the flow between human intents and robot intents so that the translation makes logical sense. In some implementations, there is a protocol for the flow that non-engineers would be able to control in order to change or update the translation from a human intent to a robot intent. The flow may also be learned automatically using machine learning.

In another implementation, the input human intent resolution can be a hidden layer and machine learning can be used to learn the output robot intents directly from the input text. The human speech input can be changed to text and then robot intents can be determined directly from this text. In still another implementation, the system can output intent directly from human speech. Both of these designs use machine learning to learn the robot intents corresponding to the context and respective inputs.

The text-to-intent module 130 is configured using a schema of the possible incoming intents, example sentences for each such intent, and a language-bias configuration. Essentially, the text-to-intent module 130 is responsible for "snapping" an incoming sentence into a pre-defined (or an "unknown") list of intents, while accounting for unfamiliar phrasings and for errors in the speech recognition process. For example, in some implementations, the text-to-intent module 130 can identify that the sentence (as received from the speech recognition module) "who be open eleven o'clock in the morning till nine o'clock tomorrow nine thirty I'm sorry" is similar to the known example "we open at+(TIME, from_time) and close at+(TIME, to_time) I'm sorry", which is an example of the intent "WeAreOpen {from_time=11 am, to_time=9:30}". Fields like the "from_time" and "to_time" are the intent parameters.

The text-to-intent module 130 may be composed of two main parts: (1) annotators and (2) annotated-text to intent classifier. In some implementations, the system has a post-classification phase which does argument classification. For example, for the phrase "Monday to Tuesday, sorry Wednesday, we are closed," the annotation part would rewrite the text into: "<DATE: Monday> to <DATE: Tuesday>, sorry <DATE: Wednesday> we are closed." This example shows that the phrase is rewritten with annotators that specify the annotations in response text. The annotated-text intent classification would turn the annotated phrase into: WeAreClosed {day1: monday, day2: tuesday, day3: wednesday}. The post-classification phase would rewrite the phrase into: WeAreClosed { from_day: monday, to_day: wednesday, wrong_to_day; tuesday}.

As soon as the system 100 receives speech options, it annotates each one of them for dates, times, common names, etc., using the text-to-intent module 130. This is done for two purposes: (1) extracting the intent parameters for the logic module (e.g., "time: 10 am"); (2) generalizing the text to simplify finding a match to sentences previously encountered. The text-to-intent module 130 receives output from the speech-to-text module 126 and annotates the list of speech options. The text-to-intent module 130 then uses the annotations to map the most likely option to an intent that is used by the flow manager 132 to select a next action within a particular work flow.

In order to reduce computation time during the call, the system 100 can build, in advance, a library of known texts that should be annotated (relative to the current time and date). For example, on Tuesday Sep. 1, 2015, "tomorrow", "this Wednesday", "September 2nd", etc., may be stored as candidates for the "DATE: (2015,Nov. 2)" annotation. In real-time, the system 100 iterates sequentially on the words in the input sentence (after some canonization) and search for the longest match of an annotation candidate. The system 100 then replaces the text with the annotation and return an edited string where all candidates, left to right, are replaced with annotations. For example, "we open at 7 in the morning" will be replaced with "we open at @(TIME, 7 am)".

The annotator or text-to-intent module 130 can also be responsible for contractions. For example, the system 100 can encounter a sentence like "let me see . . . yes, 4, 4 pm". The text-to-intent module 130 may replace "4, 4 pm" with a single "@(TIME, 4 pm)" annotation. Furthermore, the text-to-intent module 130 might contract small time corrections such as, "we close at 10, ah, 10:30 pm" to "we close at @(TIME, 10:30 pm)".

In other implementations, the system may use other methods for annotating the text such as: a machine learning algorithm that can learn how to annotate the text based on curated data; prefix trees that can be used to annotate the text; or rule-based patterns that may be derived specifically for annotations.

The text-to-intent module 130 parses and annotates new sentences on most calls, and the speech recognition often distorts many of the spoken words. The system 100 has thousands of intents stored per use case, and classifies each sentence as having an intent from the stored intents that is determined to be most relevant to the sentence based on the parameters of the sentence. For example, based on detecting words in a particular sentence that suggest a question asking for the caller's name, the system 100 can classify the particular sentence as having the intent of asking for a name. In some implementations, the system 100 does not recognize an intent for a sentence, and can classify the sentence as having an unknown intent.

The text-to-intent module 130 uses machine learning algorithms to handle classification. For example, the system may use a combination of a conditional random field module with logistic regression modules. In one implementation, the classification is done on the sentence level, i.e., a string of text is converted to a set or list of intents. In another implementation, every token in the original string is classified to an intent and intent boundaries are also classified. For example, the sentence, "On Monday, we open at seven, let me thing . . . on Tuesday, we open at eight," would be classified in the first implementation as containing the intents: GiveDailyHours+AskToWait. In the second implementation, the substring "on Monday we open at seven," would be classified as the boundaries of a GiveDailyHours intent, the substring "let me think . . . " would be classified as another intent of type AskToWait, and the substring "on Tuesday, we open at eight," as another intent of type GiveDailyHours.

In some implementations, the text-to-intent module 130 may not use machine learning algorithms, but instead uses a set of examples for each intent, and then uses 1-nearest neighbor (a pattern recognition algorithm) between each speech option and all examples, where the distance metric of the algorithm is a variation of normalized edit distance (a way of qualifying how dissimilar two strings, e.g., words, are to one another) of the words of the sentence. The distance between two individual words is more complicated, and aims to be an approximation of a phonetic distance. In some examples, semantic distance may be determined by the annotated text-to-intent module 130.

In practice, the text-to-intent module 130 also can also use cross speech options signals (e.g., a number that exists only in one of the speech options is likely a bad interpretation). In some examples, the text-to-intent module 130 biases the result of the annotated-text to intent module based on the system context as a prior. Finally, the text-to-intent module 130 has some tailored extractions for nebulously-defined intents like "ComplexOpeningHours" where the system is able to identify that a complex phrasing of the opening hours had been given, but the system could not correctly extract the parameters (e.g., ". . . dinner is served until 9, you can order desserts for one more hour, and the bar is opened until 2, but we don't accept customers after 1 . . . " etc.).

In some examples, the examples used for classification are automatically deduced based on curated past calls, and can also be edited manually. The generalization process may replace the text with annotations and omits suspicious curations.

In some examples, the human does not speak a single intent, but rather a sequence of intents. For example: "you want a haircut? what time?" The example system supports any number of intents in a given sentence. In some examples, the annotated-text to intent module determines specifically positive and negative intents as prefixes for other intents (e.g., "no sir, we will be closed at this date"=>Negative+WeAreClosed). In some examples, the annotated-text to intent module supports any chaining of intents.

The system includes multiple modules that perform different functions of organizational logic, including the flow manager 132, which includes a common sense module 133, and the bailout module 136.

The flow manager 132 can include custom code per vertical that tracks each call and determines how to respond to each intent received from the human (or a long silence). However, in other implementations, the flow manager is generic across verticals. The response is a list of synthetic intents to say to the human 104 (the bot can also choose to remain silent), and sometimes a command to end the call. The flow manager 132 is also responsible for generating the outcome of the call, including any information gathered during it. In some examples, the system 100 learns how to react to each input is based on live calls, initially made by human and later on by a 'child' bot. The system 100 keeps the logic as flexible as possible to account for any misunderstanding it had during the call.

The system 100 has multiple flows, each of which is tailored for a particular type of task, such as determining opening hours for a business or making a reservation for a salon appointment. The system 100 can maintain common libraries shared between the different flows, and extract sub-flows from the history of placed calls, allowing the system to jump-start a new vertical for each task. In some examples, the system 100 may automatically learn flows for different tasks based on the manually placed calls.

Humans may skip some important details when speaking without confusing their conversation partner. For example, a human might say "we open 10 to 4". The bot needs to understand whether the business opens at 10 a.m. or 10 p.m., and similarly, whether it closes at 4 pm or 4 am. If, for example, the business is a nightclub, the bot might be expected to assume 10 p.m.-4 a.m.; if the business is a restaurant, the bot might be expected to assume 10 a.m.-4 p.m., etc.

The flow manager 132 includes a common sense module 133 that disambiguates intents in received speech input. In some examples, the flow manager 132 includes multiple types of common sense modules, e.g., a module that learns from statistics over some data set (e.g., the baseline local database), and a module that is manually programmed. The first type of module takes a data set of options (e.g., opening hours) and calculates the p-value for each option and suboption (e.g., "2 am-4 am" or just "2 am"?). The second type of module uses a set of predefined rules that prevent the system from making "common sense" mistakes that might reside in the dataset. Whenever there are multiple ways to interpret some variable, the flow manager 132 can combine the two scores to determine the most probable option. In some examples, the flow manager 132 concludes no option is probable enough, and the system 100 falls back on trying to explicitly ask the human to clarify what they meant.

The common sense module 133 can use data from similar callees to select a most probable option. For example, if most bars in Philadelphia operate from 8 p.m. to 2 a.m., the common sense module 133 can determine that the most probable option for an ambiguous phrase: "we're open from 10 to 2" is that the speaker meant 10 p.m. to 2 a.m. In some examples, the common sense module 133 can indicate to the flow manager 132 that further clarification is required. For example, if most post offices in Jackson, Miss. have business hours of 10 a.m. to 5 p.m., the common sense module 133 may instruct the flow manger 132 to ask for clarification if the system 100 believes that the callee responded that their hours are "2 p.m. to 6 p.m.," which is a threshold amount different from the typical post office.

Sometimes, there is an accumulated strain during the call, usually due to high background noise, exceptional scenarios, a heavy accent, or just a bug in the code. Strain may also be caused by unexpected intent. For example, when calling a restaurant, the system might encounter the unexpected sentence: "so, do you want to make a presentation?" or "we don't have a TV to show the Super Bowl, just so you know." The system should handle intents that it has previously not encountered. In order to identify problematic conditions for either party, the bot tries to quantify the amount of stress exhibited during the call. The bailout module 136 can mimic an operator supervising the call and choose when to implement manual intervention.

The operator controller 134 is communicably connected to the flow manager 132, and the operator controller 134 allows a human operator to provide instructions directly to the flow manager 132. In some examples, once a call is transferred to a human operator to handle, the operator controller 134 puts the flow manager 132 into a holding pattern or pauses or shuts down the flow manager 132.

Once the flow manager 132 selects a next node within a particular workflow based on the determined intent from the text-to-intent module 130, the flow manager 132 provides instructions to the intent-to-text module 124. The instructions provided by the flow manager 132 include a next intent to be communicated to the callee through the communications platform 102. The intent-to-text module 124 also produces markup cues for the speech synthesis, e.g., defining a different emphasis or prosody on some of the words. The intent-to-text module 124 can use manually defined rules or reinforcement learning to produce new text from intent.

The output of the intent-to-text module 124 is text to be converted into audio data for output at the communications platform 102. The text is converted into audio by the text-to-speech module 118, which uses previously stored text-to-speech outputs and readings 122. The text-to-speech module 118 can select previously stored outputs from the stored outputs/readings 122. In some implementations the system will use a text-to-speech synthesizer during the call. For example, if a common response selected by the flow manager 132 for the bot to provide is "Great, thank you for your help!" the text-to-speech module 118 can select a previously generated text-to-speech output without having to generate the output at run-time. In some examples, the text-to-speech module 118 uses a third party API accessed through a network connection, similar to the speech API 128.

As discussed above, in certain examples, a user may initiate a task for the system 100 by interacting with search (e.g., web search) results provided to the user. For example, the user may look up "book a table for two tonight at a Michelin starred restaurant." The task manager module 140 may receive a task and store the task information in the task information storage 150. The task manager module 140 may then determine when to schedule the task and set a triggering event. For example, if the user requests to book a table before the Michelin starred restaurant is open, the task manager module 140 may determine when the restaurant is open and set a triggering event for that time. If the task manager module 140 knows that there will be a delay in processing because of the triggering event, the task manager module 140 may alert the user to the delay by providing a visual, audio, or some other indication. In some implementations, the task manager module 140 may provide information about the time it will take to complete the task, when the task is scheduled to start, or provide more information as to why the task is delayed.

The trigger module 110 may detect that a particular trigger event (in this example, the opening time of the restaurant) has occurred, and instructs the dialer 106 to place a call. In some examples, the system 100 can present the user with options to select a restaurant to call. In other examples, the system 100 can automatically place a call to a particular restaurant selected based on a set of characteristics. The user can define default preferences for placing calls for particular tasks. For example, the user can designate that the system 100 should select the closest restaurant to the user's current location to call, or that the system 100 should select the most highly rated restaurant to call.

In certain examples, the system 100 includes or forms a part of, or is configured to communicate with, a communications application, such as a messaging or chat app that includes a user interface through which a user provides to the system requests for assistance with a task. For example, the user may be able to text a number with a request, such as "does Wire City have 20 AWG wire in red?" using a messaging application. The system may receive the text message, parse the request to determine that a trigger event has occurred, and initiate a call to carry out an appropriate action. For example, the system may place a call to the nearest Wire City to inquire as to whether they have 20 gauge red wire in stock at the moment.

Similarly, in certain examples, the system 100 includes or forms a part of, or is configured to communicate with a virtual assistant system that itself is a collection of software agents for assisting a user with various services or tasks. For example, the user may input to a virtual assistant (by voice or text entry) "is my dry cleaning ready?" The virtual assistant may process this input and determine that communication with a business is required to satisfy the query, and accordingly communicate with the system to identify intent, place the call, and execute the appropriate workflow.

In certain examples, the system 100 autonomously executes a task through multiple dialogs with multiple humans, respectively, and may collect, analyze, take action on, and/or present individual or cumulative results of the dialogs. For example, if a task is assigned to the system 100 to gather data on when the busiest time is for a number of restaurants in a specified area, the system 100 may automatically place calls to each restaurant asking how many customers are seated over a period of time to analyze the data and provide a result.

Figure 2A:
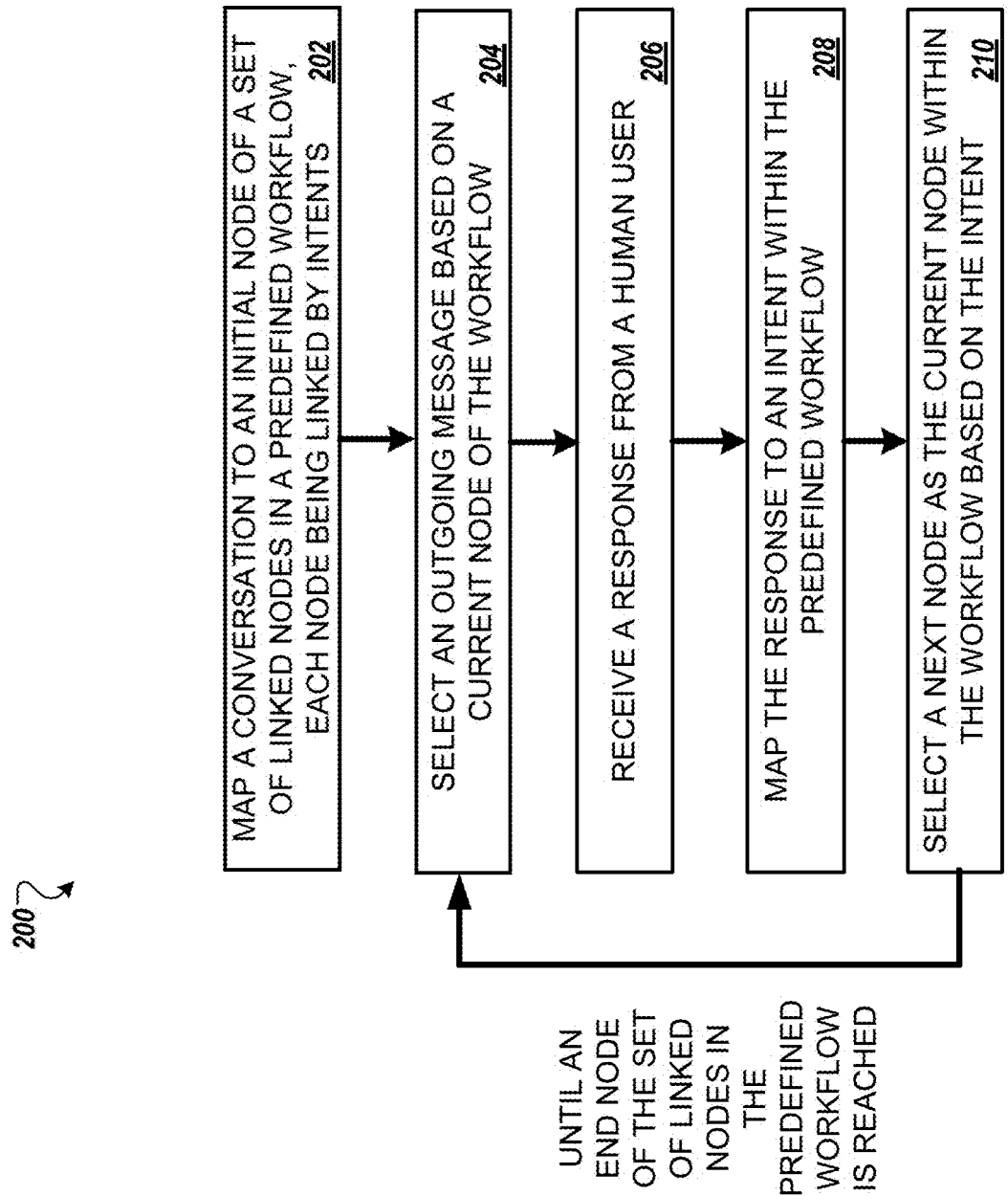
FIG. 2A is a flow diagram that shows an example of a process for completing a task assigned by a user.

FIG. 2A shows an example process 200 for completing a task assigned by a user. Briefly, the process 200 may include mapping a conversation to an initial node of a set of predefined workflows, each linked by intents (202), selecting an outgoing message based on a current node of the workflow (204), receiving a response from a human user (206), mapping the response to an intent within the predefined workflow (208), selecting a next node as the current node within the workflow based on the intent (210), and repeating 204-210 until an end node of the set of linked nodes in the predefined workflow is reached. The process 200 can be executed by a call inhibiting system, such as the system 100.

The process 200 may include mapping a conversation to an initial node of a set of predefined workflows, each linked by intents (202). For example, the flow manager 132 as described above with respect to FIG. 1 can map a conversation to an initial node of a set of predefined workflows that are each linked by intents. In some examples, a conversation between the system 100 and a human callee may be initiated by a user. In some examples, the conversation includes an intent that maps to a node of a set of predefined workflows. For example, the system 100 may store a set of predefined workflows with actions to be performed. In some examples, the system may select a predefined workflow based on the identified intent. Each of the workflows may be linked by intents. In some examples, the system 100 may place a telephone call to a business specified by the user in the conversation. In some examples, the business may be a restaurant, a salon, a doctor's office, etc. In some examples, the system may consider the call successfully placed only if a human answers, and if no one answers, or if the system is directed to a phone tree and does not successfully navigate the phone tree, the system may determine that the call was not successfully placed.

The process 200 may include selecting an outgoing message based on a current node of the workflow (204). For example, the flow manager 132 may select a message saying "Hello, I would like to schedule an appointment for a haircut," if the current node of the workflow indicates that the user would like to schedule such an appointment.

The process 200 may include receiving a response from a human user (206). For example, the system 100 may receive a response from a human callee on the other end of a telephone call, such as "Sure, and what time and date would you like to schedule this appointment for?". In some examples, the system 100 may record the response (e.g., using the session recorder 114). In some examples, the system 100 may reproduce the response for a human operator. In some examples, a human operator may be monitoring the call (e.g., using the operator controller 134).

The process 200 may include mapping the response to an intent within the predefined workflow (208). The flow manager 132 can map the response to an intent within the predefined workflow. In some examples, the system compares the identified intent with the intents through which the set of predefined workflows are each linked.

The process 200 may include selecting a next node as the current node within the workflow based on the intent (210). For example, the flow manager 132 may determine, using the intent, a next node of the workflow. The flow manager 132 may then designate the next node as the current node. The process 200 may include repeating 204-210 until an end node is reached. Thus, the designated current node is used in each repeated cycle of 204-210 to determine the next outgoing message until an end node is reached.

Figure 2B:
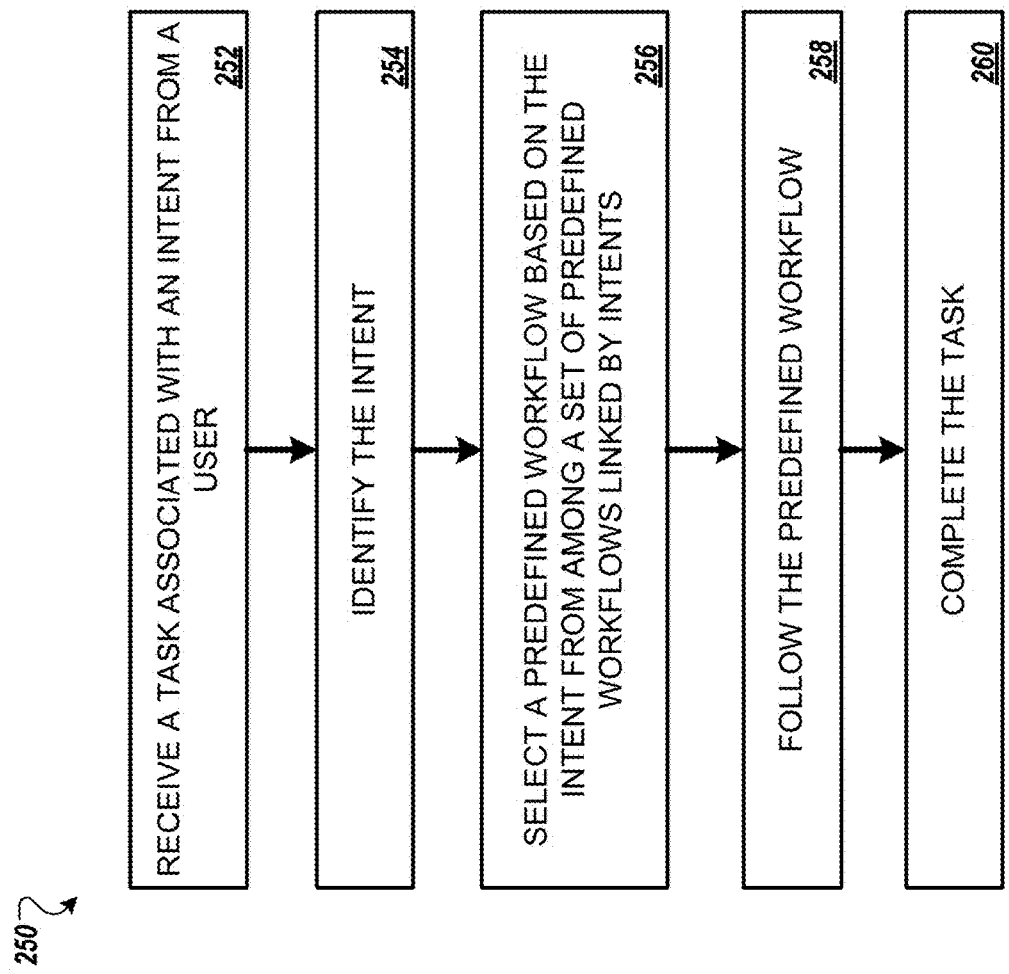
FIG. 2B is a flow diagram that shows another example of a process for completing a task assigned by a user.

FIG. 2B shows an example process 250 for completing a task assigned by a user. Briefly, the process 250 may include receiving a task associated with an intent from a user (252), identifying the intent (254), selecting a predefined workflow based on the intent from among a set of predefined workflows linked by intents (256), following the predefined workflow (258), and completing the task (260). The process 250 can be executed by a call initiating system, such as the system 100.

The process 250 may include receiving a task associated with an intent from a user (252). For example, a user may submit a search query "book an appointment for a haircut" to the system 100 through a user interface. In some examples, the search query may be received by the trigger module 110, which detects that the query is a trigger event that indicates that a call should be placed to a particular callee. The task may be to book an appointment, and the intent may be to get a haircut. In some examples, the task or the intent may not be explicitly entered. In some examples, a user may submit a task and an intent without entering a search query. The task associated with an intent may be received by a system for assisting with tasks.

The process 250 may include identifying the intent (254). For example, the system 100 may process the received task associated with an intent and identify the intent. In some examples, the intent may be explicitly input and separate from the task. In some examples, the intent may be a property of the task. In some examples, the input is provided as speech input, and the speech endpoint detector r 120 provides a parsed output to the speech-to-text module 126 which sends the text to the text-to-intent module 130, which identifies an intent.

The process 250 may include selecting a predefined workflow based on the intent from among a set of predefined workflows linked by intents (256). For example, the system 100 may store a set of predefined workflows with actions to be performed. In some examples, the system may select a predefined workflow based on the identified intent from (254). For example, the flow manager 132 can select a predefined workflow based on the identified intent from (254) by the text-to-intent module 130. In some examples, the system compares the identified intent with the intents through which the set of predefined workflows are each linked.

The process 250 may include following the predefined workflow (258). For example, the system 100 may include modules that follow instructions included in the predefined workflow. In some examples, a bot of the system 100 may follow the instructions included in the predefined workflow. For example, instructions may include instructing the trigger module 110 to provide control data to the dialer 106 to place a call to and converse with a human representative of a business.

The process 250 may include completing the task (260). For example, the system 100 may complete the entire task assigned, such as paying a bill, changing a reservation for dinner, etc. In some examples, the system 100 may complete a portion of the task, such as placing a call and navigating a phone tree until it reaches a human. In some examples, the system 100 may complete a portion of the task specified by the user. For example, the user may specify that the system complete all of the task and transfer the call to the user for verification.

Many use cases may involve users who want to purchase something from a business, but have trouble doing so due to complexity, menu navigation, language challenges, reference knowledge, etc., required for the transaction. Transaction queries may garner support from humans on the vendor side willing to help the system succeed in order to complete the transaction. In some examples, the system provides critical assistance in developing countries and low tech and service industries, such as plumbing, roofing, etc. Workflows may be employed to both assist a human user to successfully navigate such transactions as well as encourage the vendor-side system to assist the user. The system is scalable to accommodate varying use cases. For example, a restaurant booking application may partner with thousands of businesses worldwide; the system disclosed herein can be configured to issue a restaurant booking at whatever scale is required.

Figure 3:
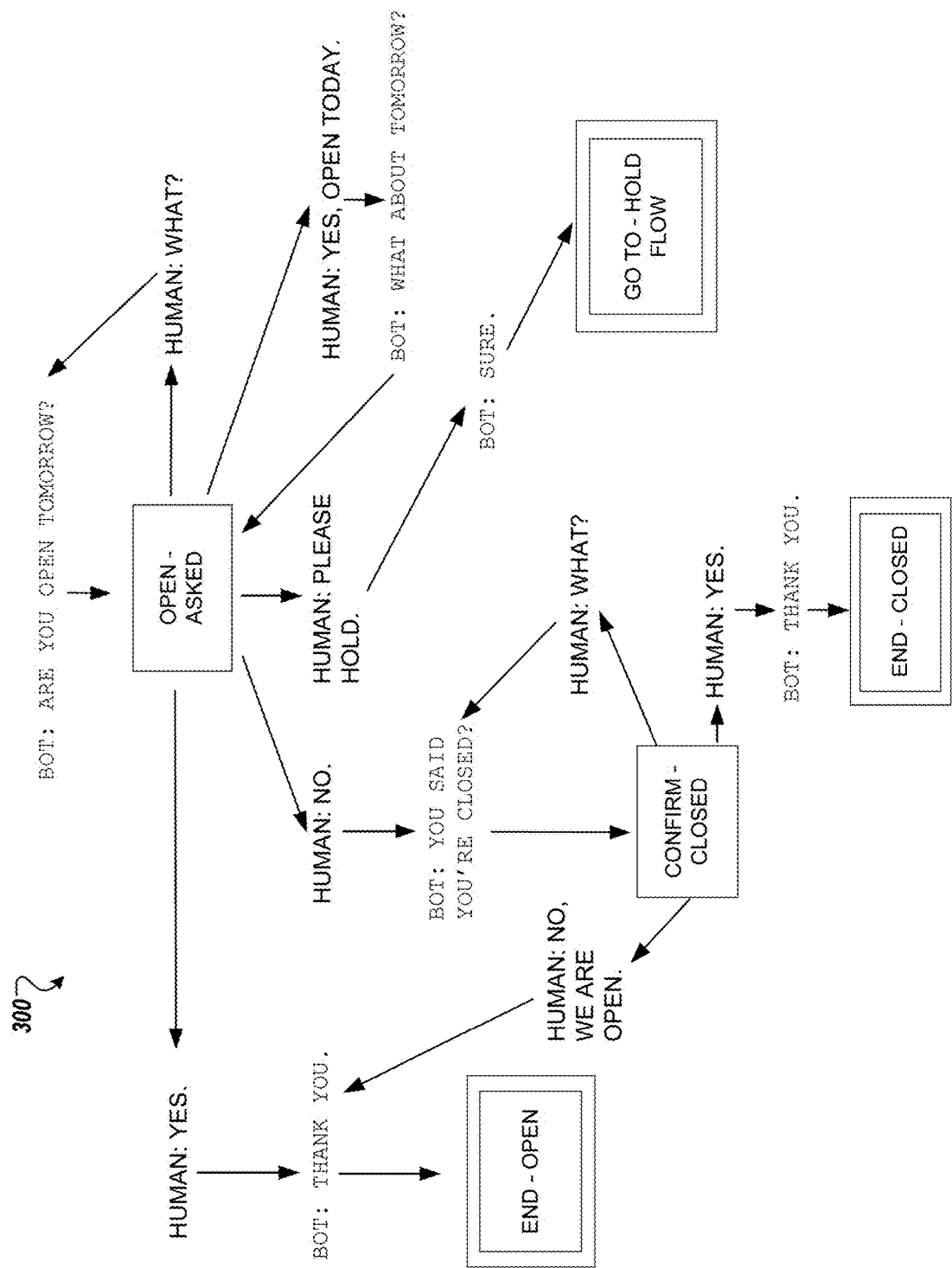
FIG. 3 shows an example workflow for a process executed by the system.

FIG. 3 shows an example workflow 300 for a process executed by the system. In this particular example, a simple Boolean question is asked by the bot of the system 100. It is understood that the system is able to respond to questions of higher complexity, and that the work flow 300 is presented for simplicity of explanation.

The flow 300 shows an example question posed by the bot: "Are you open tomorrow?" The possible responses provided by the human are laid out, and the bot's responses to each of the human's responses are provided. Depending on the human's response, there are several stages of the flow 300 to which the system 100 could be directed. Stages shown in double-borders are end stages in which system 100 exits the flow 300. For example, in response to the binary question posed by the bot, the human callee could confirm that the business is open tomorrow, ending the flow 300. The human callee could confirm that the business is not open tomorrow, ending the flow 300. The human callee could ask the bot to hold, thus sending the bot into a hold flow separate from the flow 300 and ending the flow 300.

For ease of access to users and to promote propagation of the system 100, the system 100 is integrated with existing applications, programs, and services. For example, the system 100 may be integrated with existing search engines or applications on a user's mobile device. Integration with other services, or verticals, allow users to easily submit requests for tasks to be completed. For example, the system 100 may be integrated with a search engine knowledge graph.

In some use cases, real-time judgment of a human might be automated. For example, the system 100 may automatically detect that the user is running ten minutes late to a barber shop appointment and alert the barber prior to the user's arrival.

The system 100 can select certain parameters of the bot based on the context of the conversation being conducted or data about a particular callee stored within a knowledge database. For example, the system 100 can determine based on a callee's accent, location, and other contextual data, that the callee is more comfortable with a language different than the language the call is currently being conducted in. The system 100 can then switch to the language with which the bot believes the callee is more comfortable and ask the callee if he or she would prefer to conduct the call in the new language. By mirroring certain speech characteristics of the human callee, the system 100 increases the possibility of a successful call. The system 100 reduces potential sources of friction within a conversation due to speech characteristics to reduce the strain accumulated during a call. These characteristics can include average length of word used, complexity of sentence structure, length of pauses between phrases, the language the callee is most comfortable speaking, and various other speech characteristics.

Figure 4:
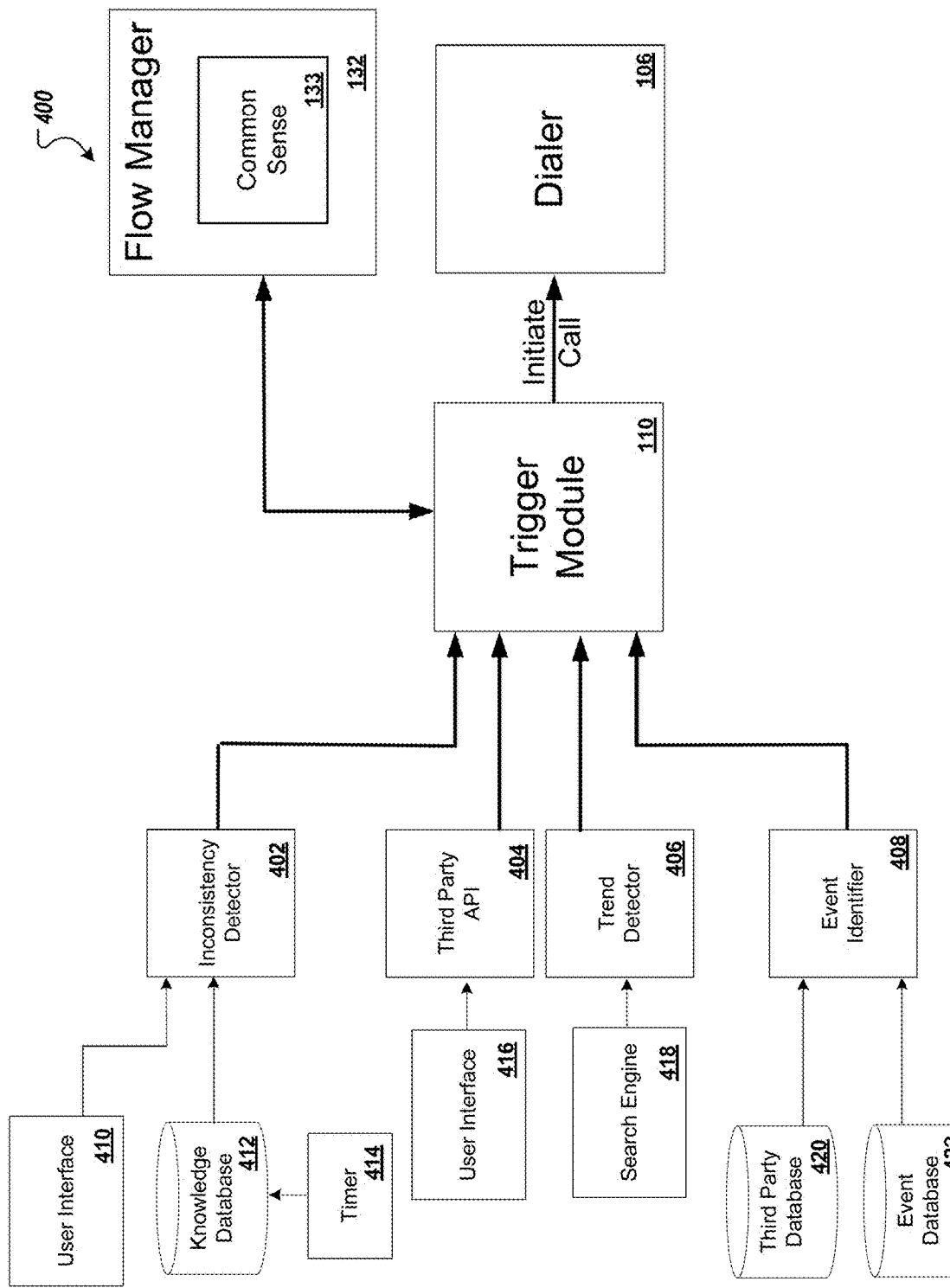
FIG. 4 is a block diagram of the triggering module.

FIG. 4 is a block diagram 400 of the call triggering module of the system 100. The trigger module 110 is communicably connected to the dialer 106, and provides instructions to the dialer 106 to initiate calls to particular callees or sets of callees based on detecting a trigger event. In some examples, the trigger module 110 can communicate with the flow manager 132 to provide trigger event data that the flow manager 132 uses to select a node of a particular workflow or provide instructions to the dialer 106.

The trigger module 110 receives input from various modules, including an inconsistency detector 402, a third party API 404, a trend detector 406, and an event identifier 408. The trigger module 110 can also receive input from the flow manager 132. In some examples, each of the modules 402-408 are integral to the system 100. In other examples, one or more of the modules 402-408 are remote from the system 100, and are connected to the trigger module 110 over a network, such as a local area network (LAN), a wide area network (WAN), the Internet, or a combination thereof. The network can connect one or more of the modules 402-408 to the trigger module, and can facilitate communication between components of the system 100 (e.g., between the speech API 128 and the speech-to-text module 126).

The inconsistency detector 402 receives data from multiple different sources and detects inconsistencies between data values from a first data source and corresponding data values from a second source. For example, the inconsistency detector 402 can receive data indicating the operating hours of a clinic and detect that the operating hours for a clinic listed on the clinic's website are different from the operating hours posted outside of the clinic. The inconsistency detector 402 can provide data to the trigger module 110 indicating the source of contention, the type of the data value in which the inconsistency was detected, the data values that are in conflict, and various other characteristics. In some examples, the inconsistency detector 402 provides the trigger module 110 with instructions to initiate a call to a particular callee. In other examples, the trigger module 110 determines, based on the data received from the inconsistency detector 402, a particular callee to contact and fields of data to be collected from the particular callee.

The trigger module 110 can detect a trigger event based on data provided by the inconsistency detector 402. Trigger events can include receiving user input indicating a discrepancy. For example, the trigger module 110 can receive user input through a user interface 410. The user interface 410 can be an interface for a separate application or program. For example, the user interface 410 can be a graphical user interface for a search engine application or a navigational application.

In some implementations, the user interface 410 can prompt a user to provide information. For example, a user is detected to be at a store after the store's advertised closing hours, the system can ask the user if the store is still open or ask the user to input the hours. The user can input the requested data through the user interface 410, and the inconsistency detector 402 can determine whether there exists a discrepancy between the data input through the user interface 410 and corresponding data from a second source, such as a knowledge base 412. The knowledge base 412 can be a storage medium such as a remote storage device, a local server, or any of various other types of storage media. The inconsistency detector 402 can determine whether the user is at the store a predetermined amount of time outside of regular hours (e.g., more than 20 minutes, because stores may stay open for a few extra minutes for a particularly slow customer).

In another exemplary situation, the inconsistency detector 402 can determine that information on an organization's website is outdated. For example, the inconsistency detector 402 can detect, based on data from the knowledge database 412, that a bass fishing club's website shows that there are monthly meetings on the first Wednesday of every month, but that the club's more active social media profiles all indicate that monthly meetings occur on the second Tuesday of every month. The inconsistency detector 402 can then output to the trigger module 110 data indicating this detected inconsistency.

Trigger events can include determining that a particular set of data has not been updated for a predetermined amount of time. For example, a user of the system 100 can specify an amount of time after which data should be refreshed regardless of any other trigger events occurring. The inconsistency detector can compare a last-updated timestamp for a particular data value and determine, based on the timestamp, whether the predetermine amount of time has passed. Characteristics for particular data fields, including timestamps and the data values themselves, can be stored in the knowledge database 412. A timer 414 can provide data to the knowledge database 412 to update the amount of time that has passed. The inconsistency detector 402 can determine that a predetermined period of time has passed based on the timing data provided by the timer 414.

For example, the inconsistency detector 402 can determine, based on data from the knowledge database 412, that operating hours for small coffee shops in Ithaca, NY have not been updated for three months. The inconsistency detector 402 can then provide output data to the trigger module 110 indicating the detected event.

Trigger events can include receiving requests to initiate a call from one or more users. For example, the trigger module 110 can detect receiving a request from a user through the third party API 404. The third party API 404 is communicably connected to a user interface, such as the user interface 416, through which a user can provide input indicating a request to initiate a call. For example, the user interface 416 can be a graphical user interface for an application through which a user can request call campaigns to be scheduled and executed. A user can provide data indicating a particular callee or set of callees, and the particular data requested for extraction. For example, a user can request that a call campaign to each hardware store in Virginia that sells livestock supplies be conducted and that the hardware stores are asked whether they provide chick starter feed (e.g., such that an index of locations carrying the supplies is available for later search).

During the call, the callee can schedule a different time for the system 100 to call the callee back. For example, if asked about whether any changes have been made to a menu of a restaurant, a human callee can ask the system 100 to call them back in an hour or the next day, after they've had a chance to look over the new menu, for further action. The system 100 can then schedule a call for the requested time. In some examples, the trigger module 110 can schedule a trigger event for the future. In other examples, the flow manager 132 can schedule an intent or a call event to be executed by the dialer 106 to initiate the call.

Trigger events can include trends or patterns detected in stored data within a knowledge database or data provided in real time. For example, trends detected in search data received from a search engine 418 can be trigger events.

Search engine 418 receives search requests from users, and can provide data indicating the search requests to the trend detector 406. The trend detector 406 analyzes the data received and detects trends in the received data. For example, if searches for Cuban restaurants in Asheville, NC have increased 500% in the past month, the trend detector 406 can detect the increase in searches and provide data indicating the trend to the trigger module 110.

The trend detector 406 can output data to the trigger module 110 that indicates a particular callee or a set of callees based on the identified trend. In some implementations, the trend detector 406 provides data indicating the detected trend and the trigger module 110 determines a particular callee or set of callees based on the identified trend. For example, the trend detector 406 can determine that there has been a 40% increase in searches for "tornado Lincoln NE" and provide the keywords of the search to the trigger module 110. The trigger module 110 can then determine that calls should be placed to all stores that provide emergency supplies to ascertain how much stock each store has of essential items, and their hours of operation (e.g., for indexing and later search by users of the search engine).

Trigger events can include particular events of interest that have been identified as having effects on normal operations of businesses, organizations, individual persons, etc. The event identifier 408 receives data from various third party sources, including a third party database 420 and an event database 422. The event identifier 408 can receive data from other sources, such as local memory devices or real time data streams. The event identifier 408 identifies particular events from the databases 420 and 422 and outputs data indicating the identified events to the trigger module 110. In some examples, the trigger module 110 selects a particular callee or set of callees and data to be requested during a call based on the data provided by the event identifier 408.

Particular events that can affect operation of businesses, organizations, and individual persons include extreme weather conditions, federal holidays, religious holidays, sporting events, and various other happenings.

The third party database 420 provides the event identifier 408 with data from various third party data sources, including the weather service, governmental alerts, etc. For example, the third party database 420 can provide the trend identifier 408 with storm warnings. The event identifier 408 can then determine that a winter storm is approaching the north-eastern corner of Minneapolis, Minn., and can determine that calls should be placed to hardware stores within the north-eastern corner of Minneapolis to determine the current stock of generators available.

The event database 422 provides the event identifier 408 with data from various data sources and specifically includes data indicating known events. For example, the event database 422 can provide data indicating federal and state holidays, religious holidays, parades, sporting events, exhibition openings, visiting dignitaries, and various other events.

For example, if a particular city is hosting the Super Bowl, the event database 422 can provide the data to the event identifier 408, which provides data indicating the event to the trigger module 110. The trigger module 110 can determine, based on known information about the current Super Bowl and stored information about the past Super Bowl, that calls should be placed to all hotels in the area to confirm availability and pricing. The trigger module 110 can also determine that calls should be placed to sporting goods stores to determine the availability of jerseys for each of the teams participating in the Super Bowl. In such situations, other information that affects operation of businesses, organizations, or individual persons that the trigger module 110 can request includes closings of office buildings and schools, changes to public transportation schedules, special restaurant offerings, or various other information.

One or more of the various modules of the system 100 can determine, based on the received event information from the event identifier 408, inferred trigger events or information to request. For example, if it is Día de Muertos, South American restaurants, and Mexican restaurants in particular, may have special menus or hours because of the celebrations. In such examples, the trigger module 110 can provide instructions to the dialer 106 to conduct calls to South American restaurants to update operating hours for the day and the menu.

In some implementations, a trigger event can be detected from the call placed by the system 100 itself. The flow manager 132 can determine, based on portions of the conversation conducted by the system 100, that an intent has been expressed during the conversation suggesting that a call should be placed. For example, if a human callee says "Yes, we are still open until 8 p.m. every Thursday, but next week we will be switching over to our summer schedule, and we will be open until 9:30 p.m.," then the flow manger 132 can identify an intent that provides further information regarding a data field.

In some implementations, a trigger event can include receiving unsatisfactory results from a previously placed call. For example, if the bot places a call to a business to determine if the business will have special holiday hours over the Independence Day holiday, and does not have at least a threshold amount of confidence in the veracity of the answer provided by the human representative of the business, the system 100 can schedule a call for another specific day or time, such as July 1, to determine whether special holiday hours will be in place. In such examples, the trigger module 110 can schedule a trigger event or provide information to the flow manager 132 to schedule an action. In some examples, the flow manager 132 schedules initiating a callback by scheduling transmission of instructions to the dialer 106.

The system 100 has a common sense module 133 that allows the flow manager 132 to schedule and select nodes of a particular workflow intelligently. For example, in the above situation, when there is a deadline for the usefulness of the information being requested during the call, the common sense module 133 can also determine when to schedule the call and what information to request. In some examples, the common sense module 133 is a component of the flow manager 132, as described in FIG. 1. In other examples, the common sense module 133 is a component of the trigger module 110 and facilitates the trigger module 110 making intelligent determinations as to whether a call should be initiated.

Figure 5:
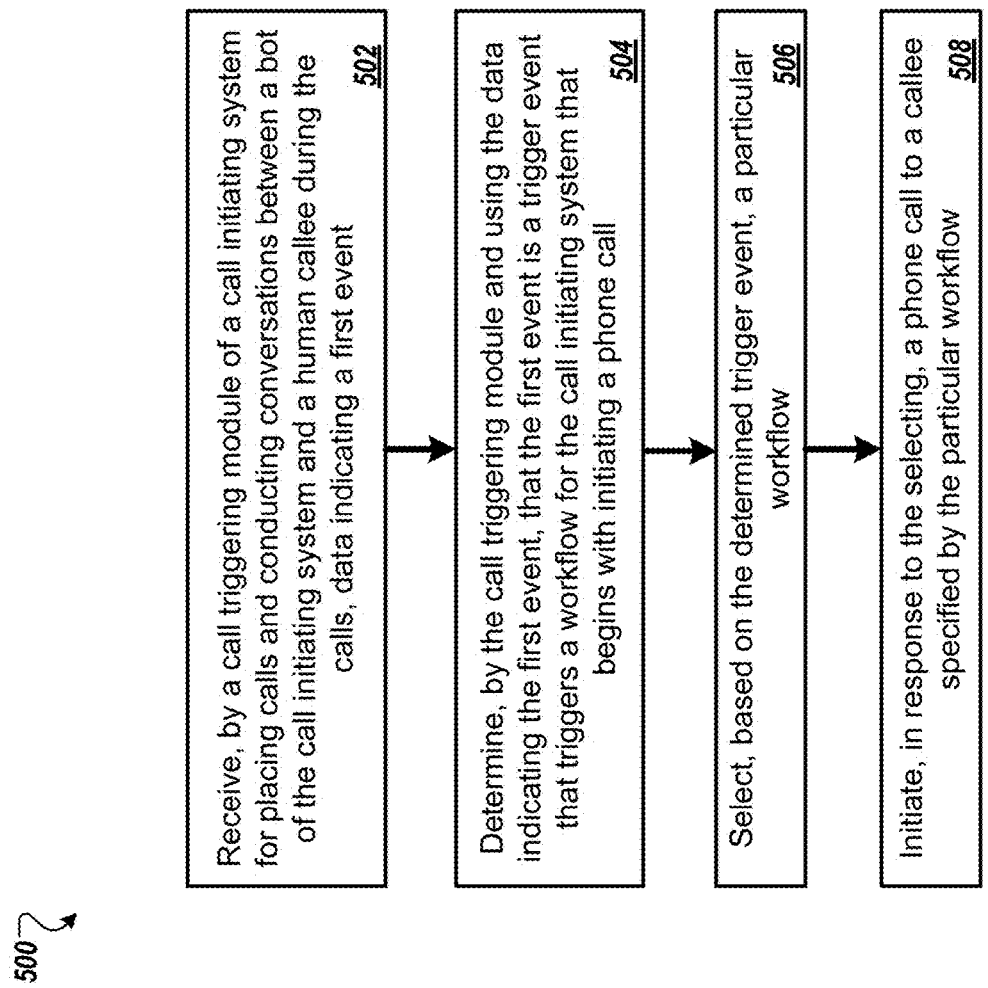
FIG. 5 is a flow diagram that shows an example of a process for initiating a phone call.

FIG. 5 shows an example process 500 for initiating a phone call. Briefly, the process 500 may include receiving, by a call triggering module of a call initiating system for placing calls and conducting conversations between a bot of the call initiating system and a human callee during the calls, data indicating a first event (502), determining, by the call triggering module and using the data indicating the first event, that the first event is a trigger event that triggers a workflow for the call initiating system that begins with initiating a phone call (504), selecting, based on the determined trigger event, a particular workflow (506), and in response to the selecting, initiating a phone call to a callee specified by the particular workflow (508).

The process 500 may include receiving, by a call triggering module of a call initiating system for placing calls and conducting conversations between a bot of the call initiating system and a human callee during the calls, data indicating a first event (502). For example, the trigger module 110 can receive data from the inconsistency detector 402 indicating a discrepancy between the business hours of Sally's Saloon of Sweets posted on the store's website and the business hours stored in a search index relating to that business.

The process 500 may include determining, by the call triggering module and using the data indicating the first event, that the first event is a trigger event that triggers a workflow for the call initiating system that begins with initiating a phone call (504). In some examples, the determined trigger event is an inconsistency of a value associated with a first data source and a corresponding value associated with a second data source. For example, the trigger module 110 can use the detected inconsistency from the inconsistency detector 402 to determine that the inconsistency is a trigger event that will trigger a workflow to determine what the actual business hours are for Sally's Saloon.

In some examples, the data indicating the first event is provided by a user. For example, a user can report that there is a discrepancy between the hours posted on the website for Sally's Saloon and the hours posted on the storefront for Sally's Saloon.

In some examples, the determined trigger event is a user request. For example, a user can provide input through a user interface, such as the user interface 416, to a third party API, such as the third party API 404, to request scheduling and execution of calls to a particular callee or a set of particular callees.

In some examples, the determined trigger event is a particular type of event that is one of: a weather event, a sporting event, an entertainment event, or a seasonal event. For example, the event identifier 408 can determine that the Head of the Charles regatta is occurring in Boston, Mass., and can provide the event data to the trigger module 110. The trigger module 110 can then determine that the regatta is a trigger event.

In some examples, the determined trigger event is a trend detected in search requests submitted to a search engine. For example, the trend detector 406 can receive search engine data from the search engine 418 and determine that Spanish tapas restaurants are trending. The trend detector 406 can provide data indicating the trend to the trigger module 110 and the trigger module 110 can determine that the trend is a trigger event.

In some examples, the determined trigger event is the passing of a predetermined period of time. For example, the inconsistency detector 402 can determine, based on data in the knowledge database 412 from the timer 414, that the menu for the Cuban restaurants in Manhattan, NY have not been updated for four months. The inconsistency detector 402 can provide the timing data to the trigger module 110, and the trigger module 110 can determine that the passing of four months without updating the menu data for the Cuban restaurants in Manhattan is a trigger event. The trigger module 110 can then provide data to the flow manager 132 suggesting that the Cuban restaurants in Manhattan be called to obtain updated menu information.

The process 500 may include selecting, based on the determined trigger event, a particular workflow (506). The trigger module 110 can provide the trigger event data to the dialer 106 or to the flow manager 132 to use in selecting a particular workflow or node of a workflow. For example, the trigger module 110 can provide the trigger event data indicating the inconsistency in posted business hours for Sally's Saloon for Sweets to the flow manager 132, which uses the data to select a particular workflow to call Sally's Saloon to resolve the discrepancies.

The process 500 may include initiating, in response to the selecting, a phone call to a callee specified by the particular workflow (508). The flow manager 132 can provide instructions to the dialer 106 indicating a particular callee to be contacted. For example, the flow manager 132 can provide instructions to the dialer 106 to call Sally's Saloon.

While the initiation of workflows, and more specifically the placement of calls, by the systems and methods described herein may be relatively automated by triggering events, safeguards may be included in system 100 to prevent unwanted calls or calls in violation of local regulations. For example, if a callee indicates that they no longer wish to receive calls from the system, the system may note this and build in checks for calls to the callee's number to prevent further calls.

Furthermore, to the extent that the systems and methods described herein collect data, the data may be treated in one or more ways before it is stored or used, so that personally identifiable information is removed or permanently obscured. For example, identity of the callee may be permanently removed or treated so that no personally identifiable information can be determined, or a callee's geographical location may be generalized where location information is obtained, so that a particular location of a user cannot be determined where appropriate. Where personal, private, or sensitive information is received during a call, whether requested as part of the workflow, volunteered by the callee, or inadvertently received, workflows may include steps for permanent removal or obfuscation of that information from the system.

In certain examples, the system 100 may provide the user with the current status of efforts to execute the request for assistance a task, either automatically or upon user request. For example, the system 100 may provide the user with a status of a task being carried out through a notification on the device the user is using, such as a computer, a mobile device, etc. In some examples, the system 100 may notify the user of the status of an ongoing task through other means, such as a messaging application, through telephonic communication, etc.

Figure 6:
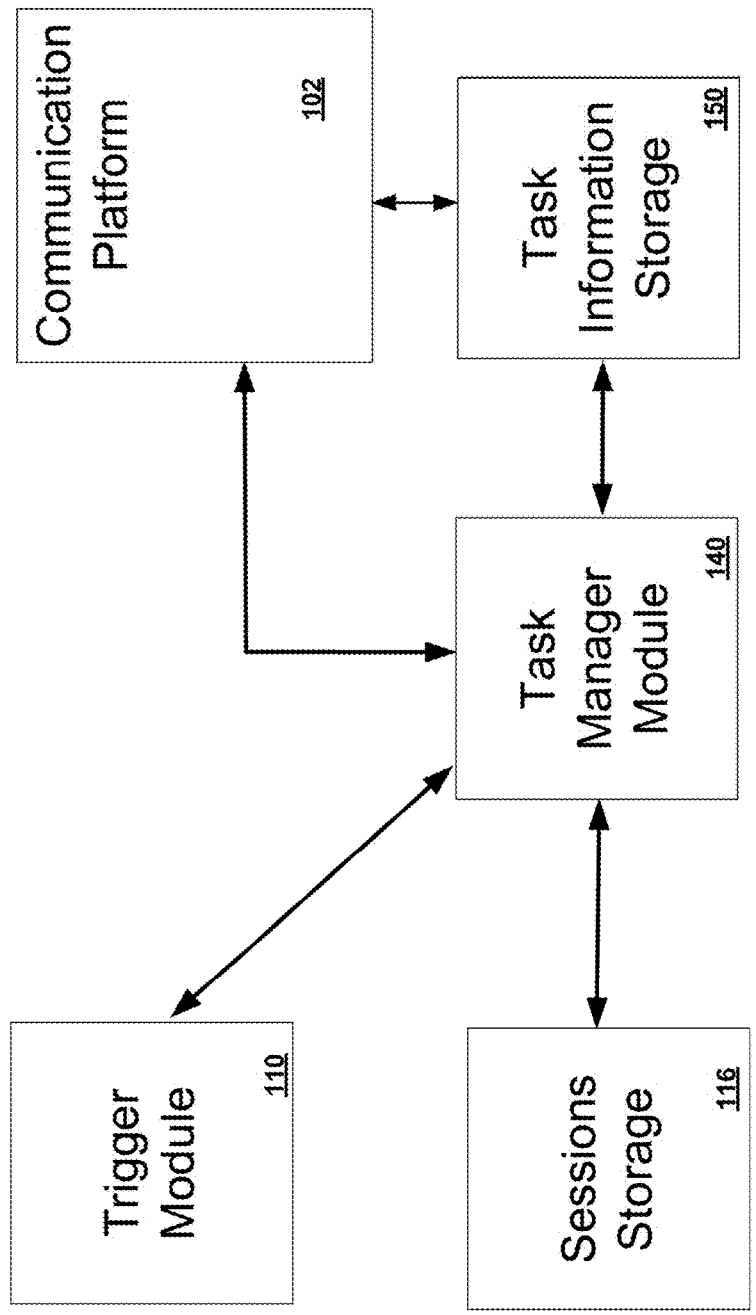
FIG. 6 is a block diagram of the task manager module of the system.

FIG. 6 is a block diagram 600 of the task manager module of the system 100. The task manager module 140 is connected to the communication platform 102, the trigger module 110, the task information storage 150, and the sessions storage 116. When a user communicates a task through the communication platform, the task information is stored in the task information storage 150 and the task manager module 140 determines when the task should be scheduled. The task manager may associate the task with a trigger event. The task may have a status that is initially set to "new" or some other indicator that there has been no processing on the request. Once the trigger event occurs, the trigger module 110 will start the dialing process. In some implementations, the task manager module 140 monitors the sessions storage to update the status of each task when the status of the tasks change from initiated, to in progress, to complete.

From the sessions information, the task manager module can determine the status and outcome of each call. For example, a bot may try to call a restaurant several times before getting through to someone to make a reservation. The sessions storage holds information about each call that the bot makes. In some implementations, the task manager module may periodically poll the session storage to determine the status of a call task, i.e., whether a call has been initialized, is in progress, or has been complete. In other implementations, the sessions storage may send the outcome of a call to the task manager module in order to update the status of the task in the task information storage.

In some implementations, a call is reviewed by an operator through an operator dashboard that displays call tasks and information about the progress of the tasks.

Figures 7A, 7B:
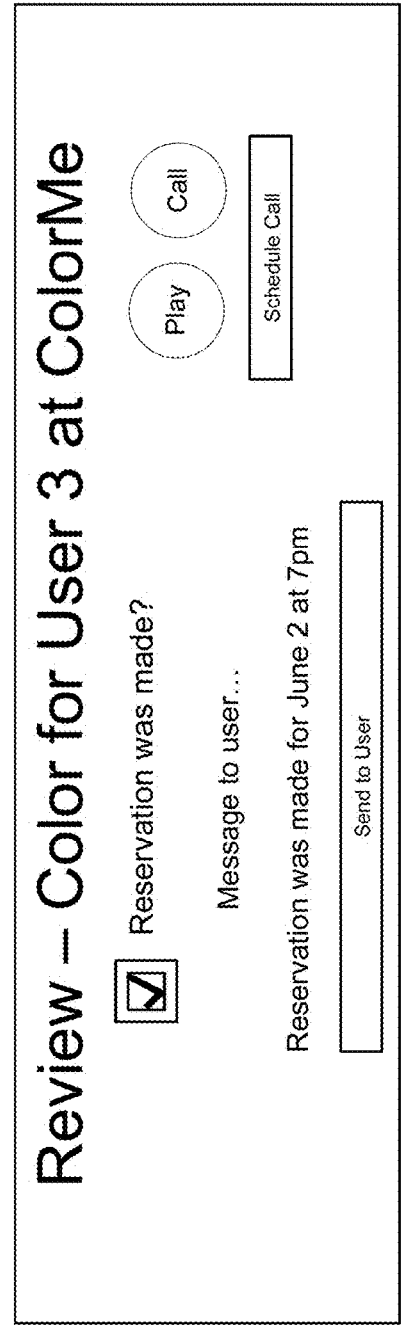
FIG. 7A illustrates an operator dashboard that shows information about progress of existing tasks.
FIG. 7B illustrates an operator review screen for reviewing one of the user requested tasks.

FIG. 7A illustrates an operator dashboard that shows information about progress of existing call tasks. For example, FIG. 7A shows tasks for haircut appointments. The operator dashboard may provide information about the appointments including: the booking time, requestor's name, service requested, business name, date, and time of the appointment. An operator may be able to review the requests and the associated sessions information from calls associated with the requests to determine if the requested appointments have been properly booked.

FIG. 7B illustrates an operator review screen for reviewing one of the user requested tasks. The screen may show the operator the current status of the task. As illustrated in FIG. 7B, the task is complete since the reservation has been made. However, in some cases, the task may not be complete and the reservation may not have been made. The operator may have the option of playing the recording associated with the task or looking at other stored information from the call, e.g., transcriptions, extracted intents, etc., calling the business associated with the task, or scheduling an automated call for the future. Additionally, the operator may have the option of providing the current status of the task to the requesting user.

A user can also request the status of a task through the communication platform 102. Additionally or alternatively, the task manager module 140 can determine when to send the user a status update based on other triggering events such as task status changes or time.

Figure 8:
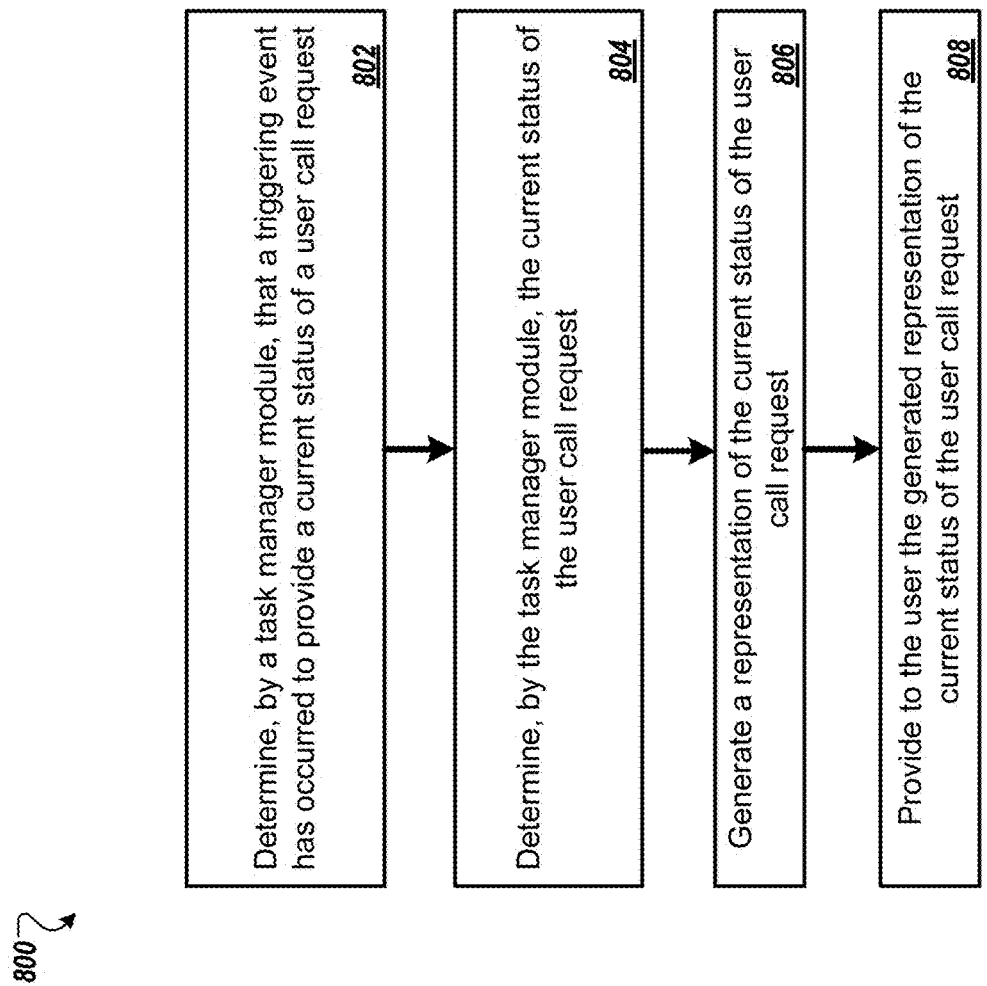
FIG. 8 is a flow diagram that shows an example of a process for providing the status of a task.

FIG. 8 is a flow diagram that shows an example of a process 800 for providing the status of a task. The process 80 may include determining, by a task manager module, that a triggering event has occurred to provide a current status of a user call request (802). As discussed above, triggering events may include: a user request for status, a passage of a certain amount of time, or a change in the status of a particular task. The process 800 then includes determining, by the task manager module, the current status of the user call request (804). The task manager module can determine the current status by checking the status in the task information storage. The status of a task is initialized when the task is added to the task information storage 150. As calls associated with the task are made and completed, the status of the task is updated. The task manager then generates a representation of the current status of the user call request (806). The representation can be a visual or an audio representation that conveys the current status of the task. The process 800 provides the user with the generated representation of the current status of the user call request (808).

Figures 9A, 9B:
FIG. 9A shows a visual status of the haircut appointment request of FIG. 1B while the appointment scheduling is in progress.
FIG. 9B shows a visual status of the haircut appointment request of FIG. 1B once the appointment has been successfully scheduled.

FIG. 9A shows a visual status of the haircut appointment request of FIG. 1B while the appointment scheduling is in progress. A user may be able to access a user interface to check the status of a task request or the status may be sent to a user device such as a smart phone, smart watch, laptop, personal home assistant device, or other electronic device. The status may be sent by email, SMS, or other mechanism.

FIG. 9B shows a visual status of the haircut appointment request of FIG. 1B once the appointment has been successfully scheduled. This status may be requested by the user or may be sent to the user without the user prompting once the appointment has been successfully booked.

Figure 10A:
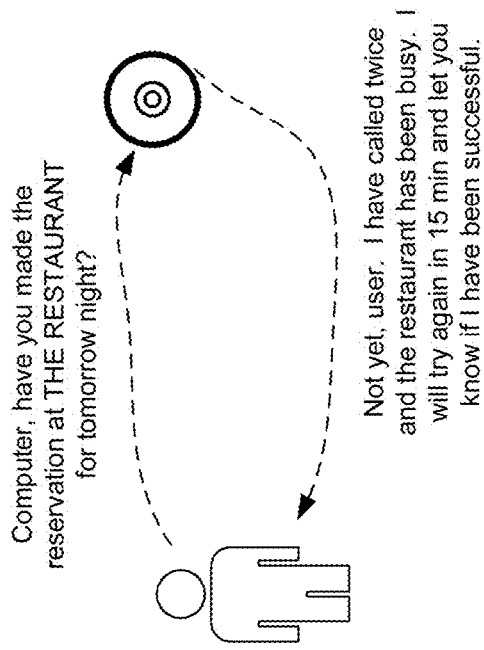
FIG. 10A illustrates an oral status request and update of the restaurant reservation request of FIG. 1C.

FIG. 10A illustrates an oral status request and update of the restaurant reservation request of FIG. 1C. As illustrated in FIG. 10A, in response to the user asking whether the restaurant reservation has been made, the system may explain the steps it has taken to complete the task, such as calling the restaurant twice. The system may also tell the user when the next time the system is scheduled to attempt the call and may notify the user of the status after the call attempt.

Figure 10B:
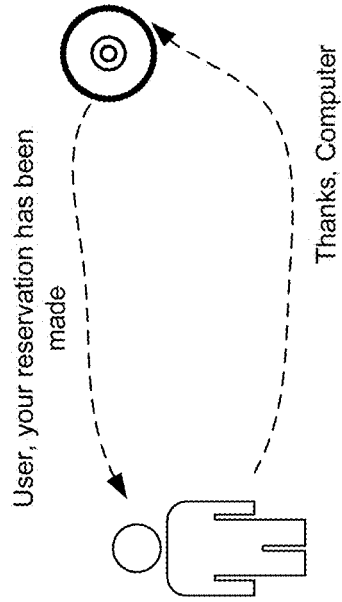
FIG. 10B illustrates an oral status update provided by the system without prompting by the user for the restaurant reservation request of FIG. 1C.

FIG. 10B illustrates an oral status update provided by the system without prompting by the user for the restaurant reservation request of FIG. 1C. Once the system knows that the user's task has been complete, the system can provide the user with a status update. In some implementations, the system provides the user with the status update immediately. In other implementations, the system determines a convenient time or method for notifying the user. For example, the user may request a dinner reservation in London, United Kingdom. However, the user may presently be located in Mountain View, Calif., USA. The system may attempt to call the restaurant at a time when the user is sleeping. If the system confirms the reservation at 12 pm in London, the system may determine that sending a status update text message at 4 am PDT may wake the user. The system may then choose an alternate status update method, i.e., email, or hold the status update for a more convenient time for the user. The system can determine the appropriate, convenient times and method to provide status updates to the user using information from the user's schedule, time zone, habits, or other personal information of the user.

In some implementations, the system may use user information to determine the urgency of a task or whether to repeat an effort to complete a task. For example, the system may be trying to make a reservation for a user at a specific restaurant in Mountain View, California. The user's travel to Mountain View may end on May 15th. If the system is still not successful on May 15th, it does not make sense for the system to continue to request reservations for May 16th or later since the user's trip will be over. However, it does make sense to call twice as often on May 14th as compared with earlier dates in order to get a hold of someone at the restaurant to make a reservation. A task may become more urgent as a deadline approaches and less urgent or obsolete as the deadline passes.

In some implementations, the bailout module 136 of FIG. 1B determines the type of intervention that should be introduced for a call while the call is in progress. The bailout module 136 may choose to manually bailout of a bot conversation in real-time and explain that another will be taking over the call. In other implementations, the module may allow a human operator to silently take over the call. Additionally or alternatively, the bailout module 136 may choose to politely end a phone call between a bot and a human with no manual intervention.

FIG. 11 shows an example process 1100 for transitioning a phone call from a bot to a human. The process 1100 may include, analyzing, by a call initiating system, a real-time conversation between a first human and the bot during a phone call between the first human on the first end of the phone call and the bot on a second end of the phone call (1102). The call initiating system may then determine based on analysis of the real-time conversation, whether the phone call should be transitioned from the bot to a second human on the second end of the phone call (1104). In response to determining that the phone call should be transitioned to a second human on a second end of the phone call, transitioning, by the call initiating system, the phone call from the bot to the second human (1106).

In order to determine the type of intervention that is most appropriate for a particular bot phone call, the bailout module 136 may identify strain events or look for other indications that the call should either be terminated or handed over to a human operator.

In some implementations, the bailout module 136 identifies strain events that indicate strain on the human or on the bot to appropriately respond to the human's questions. Each time the bailout module 136 identifies a strain event, it increases the stored levels of both local and global strain of the call. Whenever the conversation seems to get back on track, the bailout module 136 resets the local strain level. For example, the human may ask the bot, "How many highchairs will your party need?" when the bot has called a restaurant to make reservations for a party of 6. The bot may respond with, "we all need chairs." The human may have a slightly irritated tone based on the bot's response and respond, "Yes, I know you all need chairs, but how many high chairs for babies do you need?" The system may detect intonation patterns, i.e., a higher pitch at the beginning of a human's statement, at the end of the statement, or throughout the statement. In some implementations, intonation patterns are pre-associated with stress or irritation. The system can match the pre-associated patterns with the pattern detected in the real-time conversation. In some implementations, intonation patterns can detect repeated words, talking intentionally slower, or keywords or phrases ("are you even listening to me?" "am I talking to a robot?")

When the system detects a slightly irritated tone of the human it increases the local strain level of the call. The local strain is a running score that reflects the likely amount of strain associated with the current state. If any of the strain indicators appear in a human statement within the real-time conversation, the strain score rises until the score reaches an intervention threshold. If none of the stress indicators appear, the system may indicate that the call is proceeding according to the workflow and the local strain score decreases or remains low (or 0). If the bot appropriately responds to the question by providing a response expected by the human, such as, "We have no children in our party," the system can decrease the local strain. If the system detects that the human responds with no irritation in his or her voice, the bailout module may determine that the call is back on track and reset the local strain to a default value or reset to zero.

The global strain for a phone call only accumulates up. Whereas the local strain tries to evaluate whether the current correspondence with the human is strainful, the global strain tries to assess the total strain for the entire call. For example, a threshold may be set for three misunderstandings before the bot bails out to a human operator. If the bot didn't understand the human three times in a row, the local strain would be high and would cause the bot to bailout. In a different call, if the bot didn't understand the other side twice in a row, but did understand the third sentence, the local strain would get reset on the third interaction, and the conversation would probably continue. The global strain would still maintain information to indicate that there were two misunderstandings between the bot and the human. If at a later time during the call, the bot doesn't understand the human twice in a row again, the global strain level would go above a threshold and the bot will probably bail out, even though the local strain is still below the set threshold of three misunderstandings.

As discussed above, if either the local or global strain levels reach some threshold, the bailout module 136 will indicate to the system 100 that it is time for manual intervention or to politely exit from the call. In some examples, the bailout module 136 would consider an event as a strain event whenever it needs to repeat itself, apologize, ask for clarification, etc., as well as when the human corrects the system 100 or complains about the call (e.g., "I can't hear you, can you hear me?").

In some examples, the bailout module 136 would consider an event a strain event if the human asks if the bot is a robot, mocks the bot, i.e., by asking nonsensical questions, or acts in some other way that the system is not expecting, (e.g., if the system gets asked about a sporting event when trying to make a reservation for a restaurant.)

In some implementations, the bailout module 136 is a feature-based rule set that determines when the system should bailout to manual intervention. One feature-based rule may be a rule that states that when two consecutive unknown input intents occur, the system should bailout. A different rule could state that when four unknown input intents occur anywhere during the call, the system bails out to a manual operator. The system keeps track of events occur in the conversation and determines whether events have happened that meet the criteria of a rule.

In other implementations, the bailout module 136 uses machine learning to predict when to bailout to a human operator automatically. For example, the bailout module 136 can receive, as input to one or more machine learning models, intents from a conversation with a human. The machine learning models can determine, based on the received intents and historical intents and outcomes, whether to bail out to a human operator. The system can train the machine learning model on features from annotate recordings that denote when a bailout should have occurred or should not have occurred. The machine learning module can then predict when a bailout should likely occur given a set of input features.

The bailout module 136 uses many factors to determine bailout including: the conduct of the human, the tone of the human, the determined annoyance level of the human, the language the human uses, or the word choice of the human.

The system 100 can escalate a conversation being conducted by the bot to a human operator to handle. For example, if there is a threshold amount of strain in a particular conversation, the bailout module 136 can provide feedback data to the flow manager 132. The flow manager 132 may instruct the bot to hand the call over to a human operator that provides input through the operator controller 134, with or without audibly alerting the human callee. For example, the bot can say "Sure, thank you for your time today. Here is my supervisor." A human operator can then complete the task that the bot was attempting to carry out through the operator controller 134.

The bailout module 136 can also determine a confidence level, which defines the confidence that the system has in the current task being accomplished. For example, the bot may be tasked with making dinner reservations for a user. If the bot calls the restaurant and the human asks multiple questions for which the bot does not know the answer, the system may have a low confidence in the current task being accomplished. After the system receives a question for which the system does not have an answer, the system's confidence level in accomplishing the task may go lower. If the system recovers and the system determines that the conversation is moving towards accomplishing a task, the system may raise the confidence level.

In some implementations, the system hands off the phone conversation to a human operator who monitors calls. The system may alert an operator of the need to transition the phone call using an operator user interface or some other notification mechanism. Once notified, the operator may have a finite time to transition the phone call before the system determines to terminate the call. The system may use the same voice as the operator. In such cases, the transition from a bot to the operator can be transparent for the other side as the voice remains the same.

In other implementations, the system hands off the phone conversation to the human user who requested the task. The system can alert the user of the in-progress phone call. The system can let the user know when there is a problem with completing the task or when the bot has been asked a question to which the bot does not know the answer. The bot may text, email, or in some other way communicate the details of the conversation for which the bot needs user input. In some implementations, the bot will wait a threshold amount of time, i.e., 5 seconds, for the user to respond before continuing the conversation without user input. Since the conversation is happening in real-time, the bot cannot wait a long period of time for user response. In some implementations, the system may try to transition the phone call to the requesting user when the system has determined that the phone call needs to be transitioned away from the bot. As discussed above, the system may wait a threshold amount of time for the user to respond and take over the phone call. In some implementations, if the user does not take over the phone call in the threshold amount of time, the system will transition the phone call to an operator. In other instances, the system will end the phone conversation. The system may also use the same voice as the human user so that transition from the bot to the user is seamless from the other side of the conversation.

Figure 12:
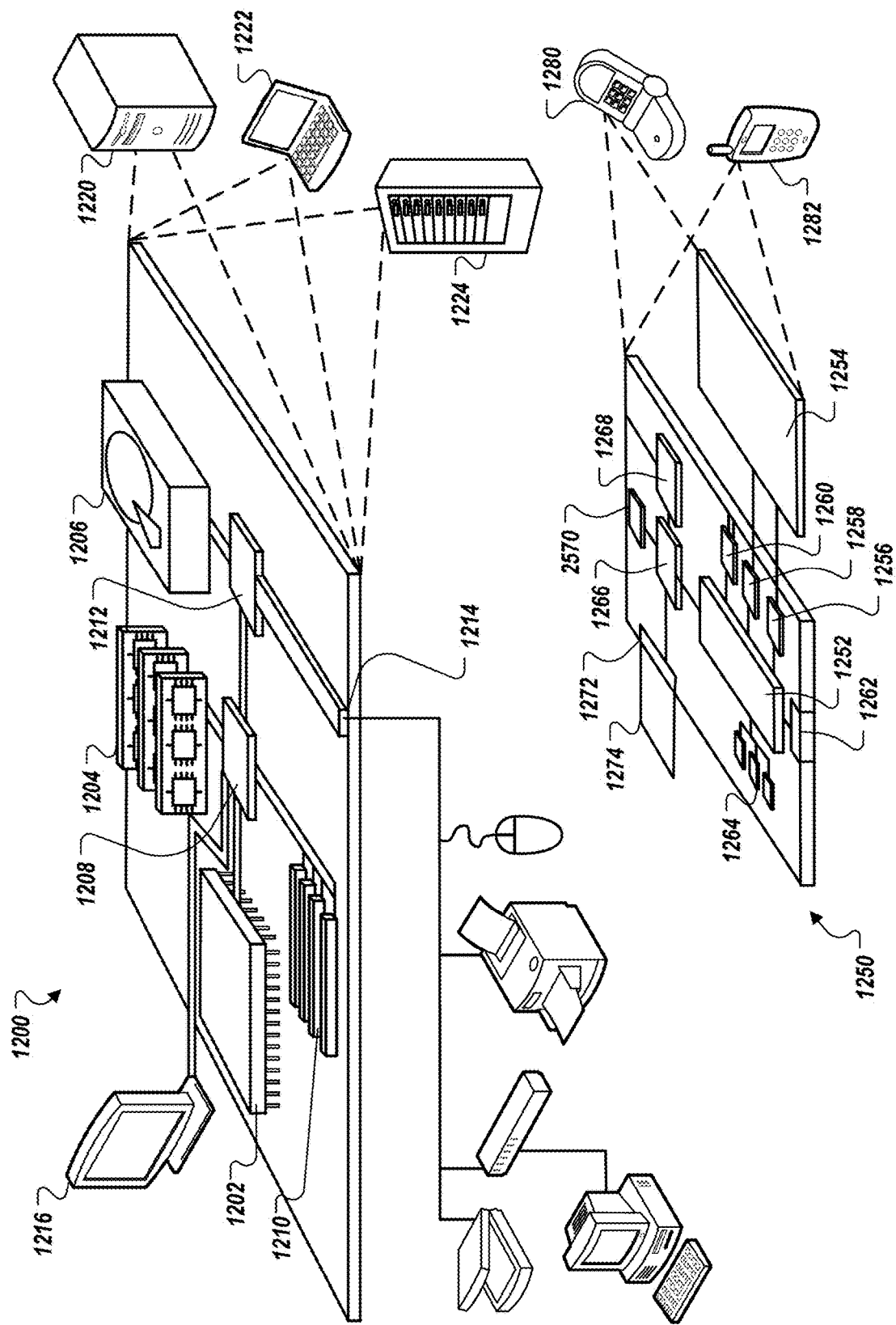
FIG. 12 is a schematic diagram that shows an example of a computing device and a mobile computing device.

FIG. 12 shows an example of a computing device 1200 and an example of a mobile computing device 1250 that can be used to implement the techniques described above. The computing device 1200 is intended to represent various forms of digital computers, such as laptops, desktops, workstations, personal digital assistants, servers, blade servers, mainframes, and other appropriate computers. The mobile computing device 1250 is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and may be mounted on a common motherboard or in other manners as appropriate.

The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 may also be another form of computer-readable medium, such as a magnetic or optical disk.

The storage device 1206 is capable of providing mass storage for the computing device 1200. In some implementations, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which may accept various expansion cards (not shown). In the implementation, the low-speed interface 1212 is coupled to the storage device 1206 and the low-speed expansion port 1214. The low-speed expansion port 1214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through an network adapter.

The computing device 1200 may be implemented in a number of different forms, as shown in the figure. For example, it may be implemented as a standard server, or multiple times in a group of such servers. In addition, it may be implemented in a personal computer such as a laptop computer 1222. It may also be implemented as part of a rack server system 1224. Alternatively, components from the computing device 1200 may be combined with other components in a mobile device (not shown), such as a mobile computing device 1250. Each of such devices may contain one or more of the computing device 1200 and the mobile computing device 1250, and an entire system may be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 may also be provided with a storage device, such as a micro-drive or other device, to provide additional storage. Each of the processor 1252, the memory 1264, the display 1254, the communication interface 1266, and the transceiver 1268, are interconnected using various buses, and several of the components may be mounted on a common motherboard or in other manners as appropriate.

The processor 1252 can execute instructions within the mobile computing device 1250, including instructions stored in the memory 1264. The processor 1252 may be implemented as a chipset of chips that include separate and multiple analog and digital processors. The processor 1252 may provide, for example, for coordination of the other components of the mobile computing device 1250, such as control of user interfaces, applications run by the mobile computing device 1250, and wireless communication by the mobile computing device 1250.

The processor 1252 may communicate with a user through a control interface 1258 and a display interface 1256 coupled to the display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may provide communication with the processor 1252, so as to enable near area communication of the mobile computing device 1250 with other devices. The external interface 1262 may provide, for example, for wired communication in some implementations, or for wireless communication in other implementations, and multiple interfaces may also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 may also be provided and connected to the mobile computing device 1250 through an expansion interface 1272, which may include, for example, a SIMM (Single In Line Memory Module) card interface. The expansion memory 1274 may provide extra storage space for the mobile computing device 1250, or may also store applications or other information for the mobile computing device 1250. Specifically, the expansion memory 1274 may include instructions to carry out or supplement the processes described above, and may include secure information also. Thus, for example, the expansion memory 1274 may be provided as a security module for the mobile computing device 1250, and may be programmed with instructions that permit secure use of the mobile computing device 1250. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 may communicate wirelessly through the communication interface 1266, which may include digital signal processing circuitry where necessary. The communication interface 1266 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDM252000, or GPRS (General Packet Radio Service), among others. Such communication may occur, for example, through the transceiver 1268 using a radio-frequency. In addition, short-range communication may occur, such as using a Bluetooth, Wi-Fi, or other such transceiver (not shown). In addition, a GPS (Global Positioning System) receiver module 2570 may provide additional navigation- and location-related wireless data to the mobile computing device 1250, which may be used as appropriate by applications running on the mobile computing device 1250.

The mobile computing device 1250 may also communicate audibly using an audio codec 1260, which may receive spoken information from a user and convert it to usable digital information. The audio codec 1260 may likewise generate audible sound for a user, such as through a speaker, e.g., in a handset of the mobile computing device 1250. Such sound may include sound from voice telephone calls, may include recorded sound (e.g., voice messages, music files, etc.) and may also include sound generated by applications operating on the mobile computing device 1250.

The mobile computing device 1250 may be implemented in a number of different forms, as shown in the figure. For example, it may be implemented as a cellular telephone 1280. It may also be implemented as part of a smart-phone 1282, personal digital assistant, tablet computer, wearable computer, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
   accessing, by a call initiating system for placing telephone calls and conducting conversations between a bot of the call initiating system and human representatives of organizations during the telephone calls, a set of linked nodes that represent a predefined, idealized conversation workflow, each node being linked by a set of one or more respective intents;
   accessing training data comprising audio samples of a respective human operator completing a task by conversing with a respective human representative from a group of human representatives of various organizations;
   for one or more audio samples corresponding to the respective representative of an organization responding to the respective operator, updating the predefined, idealized conversation workflow by associating a representation of the audio sample with one of the intents in the predefined, idealized conversation workflow or newly connecting nodes of the predefined, idealized conversation workflow using a newly defined intent;
   performing, by the call initiating system, the task for a human user by initiating a telephone call with a human representative of an organization that is not included in the group of human representatives from the various organizations; and
   using the updated conversation workflow, conducting, by the bot of the call initiating system, a telephone conversation with the human representative of the organization that is not included in the group of human representatives from the various organizations.

2. The method of claim 1, wherein the representation of the audio sample comprises a transcription of the audio sample.

3. The method of claim 1, wherein each of the one or more audio samples is manually annotated.

4. The method of claim 1, comprising annotating each of the one or more audio samples using a machine learning-trained classifier.

5. The method of claim 1, comprising assigning a likelihood that the one or more audio samples is associated with each respective intent.

6. The method of claim 1, wherein the idealized conversation workflow is updated before any bot of the call initiating system initiates a telephone call to any human representative of the various organizations or of other organizations not included in the various organizations to perform the task.

7. A call initiating system for placing telephone calls and conducting conversations between a bot and human representatives of organizations during the telephone calls, the system comprising:
   a processor configured to execute computer program instructions; and
   a computer storage medium encoded with the computer program instructions that, when executed by the processor, cause the system to perform operations comprising:
      accessing, by a call initiating system for placing telephone calls and conducting conversations between a bot of the call initiating system and human representatives of organizations during the telephone calls, a set of linked nodes that represent a predefined, idealized conversation workflow, each node being linked by a set of one or more respective intents;
      accessing training data comprising audio samples of a respective human operator completing a task by conversing with a respective human representative from a group of human representatives of various organizations;
      for one or more audio samples corresponding to the respective representative of an organization responding to the respective operator, updating the predefined, idealized conversation workflow by associating a representation of the audio sample with one of the intents in the predefined, idealized conversation workflow or newly connecting nodes of the predefined, idealized conversation workflow using a newly defined intent;

performing, by the call initiating system, the task for a human user by initiating a telephone call with a human representative of an organization that is not included in the group of human representatives from the various organizations; and using the updated conversation workflow, conducting, by the bot of the call initiating system, a telephone conversation with the human representative of the organization that is not included in the group of human representatives from the various organizations.

8. The system of claim 7, wherein the representation of the audio sample comprises a transcription of the audio sample.

9. The system of claim 7, wherein each of the one or more audio samples is manually annotated.

10. The system of claim 7, wherein the operations comprise annotating each of the one or more audio samples using a machine learning-trained classifier.

11. The system of claim 7, wherein the operations comprise assigning a likelihood that the one or more audio samples is associated with each respective intent.

12. The system of claim 7, wherein the idealized conversation workflow is updated before any bot of the call initiating system initiates a telephone call to any human representative of the various organizations or of other organizations not included in the various organizations to perform the task.

13. A computer-readable storage device encoded with a computer program, the computer program comprising instructions that, when executed by one or more computers, cause the one or more computers to perform operations comprising:

accessing, by a call initiating system for placing telephone calls and conducting conversations between a bot of the call initiating system and human representatives of organizations during the telephone calls, a set of linked nodes that represent a predefined, idealized conversation workflow, each node being linked by a set of one or more respective intents;

accessing training data comprising audio samples of a respective human operator completing a task by conversing with a respective human representative from a group of human representatives of various organizations;

for one or more audio samples corresponding to the respective representative of an organization responding to the respective operator, updating the predefined, idealized conversation workflow by associating a representation of the audio sample with one of the intents in the predefined, idealized conversation workflow or newly connecting nodes of the predefined, idealized conversation workflow using a newly defined intent;

performing, by the call initiating system, the task for a human user by initiating a telephone call with a human representative of an organization that is not included in the group of human representatives from the various organizations; and using the updated conversation workflow, conducting, by the bot of the call initiating system, a telephone conversation with the human representative of the organization that is not included in the group of human representatives from the various organizations.

14. The device of claim 13, wherein the representation of the audio sample comprises a transcription of the audio sample.

15. The device of claim 13, wherein each of the one or more audio samples is manually annotated.

16. The device of claim 13, wherein the operations comprise annotating each of the one or more audio samples using a machine learning-trained classifier.

17. The device of claim 13, wherein the operations comprise assigning a likelihood that the one or more audio samples is associated with each respective intent.

18. The device of claim 13, wherein the idealized conversation workflow is updated before any bot of the call initiating system initiates a telephone call to any human representative of the various organizations or of other organizations not included in the various organizations to perform the task.

* * * * *